United States Patent
Vittal et al.

(10) Patent No.: US 11,099,826 B2
(45) Date of Patent: Aug. 24, 2021

(54) CANARY DEPLOYMENT USING AN APPLICATION DELIVERY CONTROLLER

(71) Applicant: Citrix Systems, Inc., Fort Lauderdale, FL (US)

(72) Inventors: Chiradeep Vittal, Santa Clara, CA (US); Rajesh Joshi, Karnataka (IN); Aman Chaudhary, Karnataka (IN); Raghav SN, Karnataka (IN); Ruchit Gupta, Karnataka (IN); Bhavana Shobhana, Karnataka (IN); Sanchita Ghai, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/600,735

(22) Filed: Oct. 14, 2019

(65) Prior Publication Data
US 2021/0109734 A1   Apr. 15, 2021

(51) Int. Cl.
*G06F 8/65* (2018.01)
*H04L 29/08* (2006.01)

(52) U.S. Cl.
CPC .............. *G06F 8/65* (2013.01); *H04L 67/101* (2013.01); *H04L 67/1012* (2013.01); *H04L 67/1031* (2013.01)

(58) Field of Classification Search
CPC ..... G06F 8/65; H04L 67/101; H04L 67/1012; H04L 67/1031
See application file for complete search history.

(56) References Cited

U.S. PATENT DOCUMENTS

| 9,225,621 | B2 | 12/2015 | Tseitlin et al. |
| 10,732,962 | B1* | 8/2020 | Florescu ............. G06F 11/0751 |
| 10,936,465 | B2* | 3/2021 | Acosta ................ G06F 11/3466 |
| 2009/0007251 | A1* | 1/2009 | Abzarian ............. H04L 63/029 726/11 |

(Continued)

FOREIGN PATENT DOCUMENTS

| CN | 106155876 A | * | 11/2016 | |
| WO | WQ-2020041569 A1 | * | 2/2020 | ........... G06F 9/5072 |

OTHER PUBLICATIONS

Malina, "Kubernetes Canary Deployment Controller", May 2019, Brno University of Technology (Year: 2019).*

(Continued)

*Primary Examiner* — Wei Y Zhen
*Assistant Examiner* — Junchun Wu
(74) *Attorney, Agent, or Firm* — Banner & Witcoff, Ltd.

(57) ABSTRACT

Methods and systems for performing application deployments in a computing environment are presented herein. One or more components of the computing environment may perform a canary deployment of an updated version of an application. As the canary deployment is performed, one or more determinations as to whether to continue, stop, or complete the canary deployment may be performed. These determinations may be based on one or more metrics determined by an application delivery controller of the computing environment. The application delivery controller may be configured to divert or forward traffic to application resources that execute the updated version. Additionally, the canary deployment may be performed in an automated fashion.

20 Claims, 11 Drawing Sheets

(56) References Cited

U.S. PATENT DOCUMENTS

| | | | | |
|---|---|---|---|---|
| 2014/0379901 | A1* | 12/2014 | Tseitlin | H04L 41/5096 |
| | | | | 709/224 |
| 2016/0119207 | A1* | 4/2016 | Tseitlin | H04L 67/10 |
| | | | | 709/224 |
| 2017/0034023 | A1* | 2/2017 | Nickolov | H04L 43/0817 |
| 2018/0349179 | A1* | 12/2018 | Worboys | G06F 9/4881 |
| 2019/0034315 | A1* | 1/2019 | Acosta | G06F 11/3409 |
| 2019/0317754 | A1* | 10/2019 | Mosquera | G06Q 10/06316 |
| 2020/0112487 | A1* | 4/2020 | Inamdar | H04L 41/082 |
| 2020/0358846 | A1* | 11/2020 | Bonas | G06F 11/3409 |

OTHER PUBLICATIONS

Ahmadighohandizi et al. "Application Development and Deployment for IoT Devices", 2018, Springer (Year: 2018).*

Zhuo et al., "Canaries in the Network", 2016, ACM (Year: 2016).*

Heinrich et al., "Performance Engineering for Microservices: Research Challenges and Directions", 2017, ACM (Year: 2017).*

Mark Henke, Canary Deployment What It Is and How to Use It, Rollout Blog, May 1, 2018, 4 pages, Retrieved Oct. 8, 2019 from https://rollout.io/blog/canary-deployment/.

"Using Spinnaker for automated canary analysis," Spinnaker Guides, 2 pages, Retrieved Oct. 8, 2019 from https://www.spinnaker.io/guides/user/canary/.

Michael Graff and Chris Sanden, "Automated Canary Analysis at Netflix with Kayenta," The Netflix Tech Blog, Apr. 10, 2018, 10 pages, Retrieved Oct. 8, 2019 from https://medium.com/netflix-techblog/automated-canary-analysis-at-netflix-with-kayenta-3260bc7acc69.

Jenny Medeiros, "Automated Canary Analysis and How Netflix Uses It for Better Software," Spinnaker Summit Blog, Sep. 14, 2018, 3 pages, Retrieved Oct. 8, 2019 from https://www.spinnakersummit.com/blog/what-you-need-to-know-about-automated-canary-analysis.

Christian Melendez, "A Detailed Guide to Canary Deployments," Stackify, May 18, 2018, 20 pages, Retrieved Oct. 8, 2019 from https://stackify.com/canary-deployments/.

Eran Davidovich and Theo Chamley, "Canary analysis Lessons learned and best practices from Google and Waze," Google Cloud Blog, Jan. 14, 2019, 9 pages, Retrieved Oct. 8, 2019 from https://cloud.google.com/blog/products/devops-sre/canary-analysis-lessons-learned-and-best-practices-from-google-and-waze.

"Automating Canary Analysis on Google Kubernetes Engine with Spinnaker," Google Cloud—Solutions, last updated Sep. 13, 2019, 24 pages, Retrieved Oct. 8, 2019 from https://cloud.google.com/solutions/automated-canary-analysis-kubernetes-engine-spinnaker.

Emily Burns, et al., "Continuous Delivery With Spinnaker, Fast, Safe, Repeatable Multi-Cloud Deployments," Copyright © 2018 Netflix, Inc., Published by O'Reilly Media, Inc., 81 pages, Retrieved Oct. 8, 2019 from https://www.spinnaker.io/publications/ebook/ContinuousDeliveryWithSpinnaker.pdf.

* cited by examiner

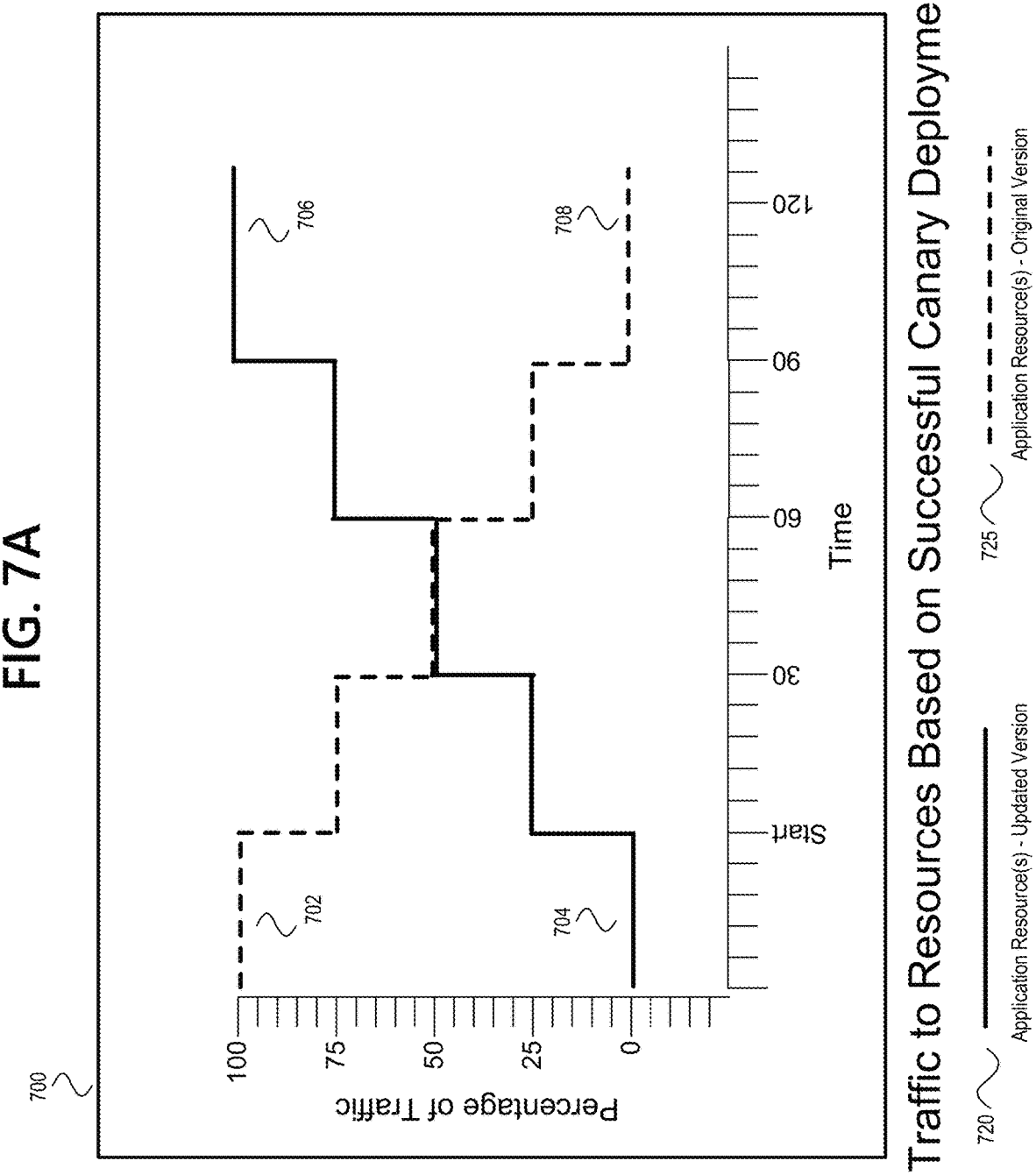

CANARY DEPLOYMENT USING AN APPLICATION DELIVERY CONTROLLER

BACKGROUND

Deploying an application, or an update to an existing application, in a computing environment, such as a cloud-computing environment, raises a number of challenges. For example, the application or update may include one or more errors that, once the application or update is deployed, negatively impact the performance of the cloud-computing environment. One type of error in the application or update may cause a service of the cloud-computing environment to become unavailable to users. Another type of error in the application or update may cause a service of the cloud computing environment to run in an unexpected manner.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein may address one or more inadequacies of application deployment, including those discussed above with respect to a computing environment, such as a cloud-computing environment. Further aspects may address other problems and may generally improve the performance of systems and methods of application deployment.

Aspects described herein may address one or more inadequacies of application deployment by using one or more components of a computing environment to perform a canary deployment of an updated version of an application. For example, the canary deployment may be performed based on one or more of an application delivery manager, an ingress controller, an application delivery controller, and an orchestrator. As an example, some aspects may relate to performing the canary deployment based on an application deployment controller that is configured to divert or forward traffic to application resources. Yet further aspects may relate to performing the canary deployment based on one or more metrics determined by the application delivery controller. Yet further aspects may relate to performing the canary deployment in an automated fashion.

These features, along with many others, are discussed in greater detail below. Additional aspects will be appreciated with the benefit of detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 7A and 7B depict example graphical views of application deployment in accordance with one or more aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As discussed above, deploying an application, or an update to an existing application, in a computing environment, such as a cloud-computing environment, raises a number of challenges. For example, the application or update may include one or more errors that, once the application or update is deployed, negatively impact the performance of the cloud-computing environment. Performing additional testing on the application or update may be undesirable and/or may not locate the errors that are causing lower performance of the cloud-computing environment. Accordingly, to overcome these limitations, and to overcome other limitations that will be apparent upon reading and understanding the present specification, aspects described herein include example systems and methods that can be used to expose the application or update over time to an increasing percentage of users within the cloud-computing environment. This form of deployment, where the application or update is exposed over time to an increasing percentage of users, is commonly referred to as canary deployment. Additional aspects described herein relate to the use of an application delivery controller of the cloud-computing environment to improve the canary deployment. For example, the application delivery controller may be used to, based on the canary deployment, divert or otherwise forward traffic to one or more application resources of the cloud-computing environment. The application delivery controller may be used to determine various metrics, which can be used to determine whether the canary deployment is to continue and/or whether the canary deployment has failed. These aspects, and others, will be discussed in detail below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Figure 1:
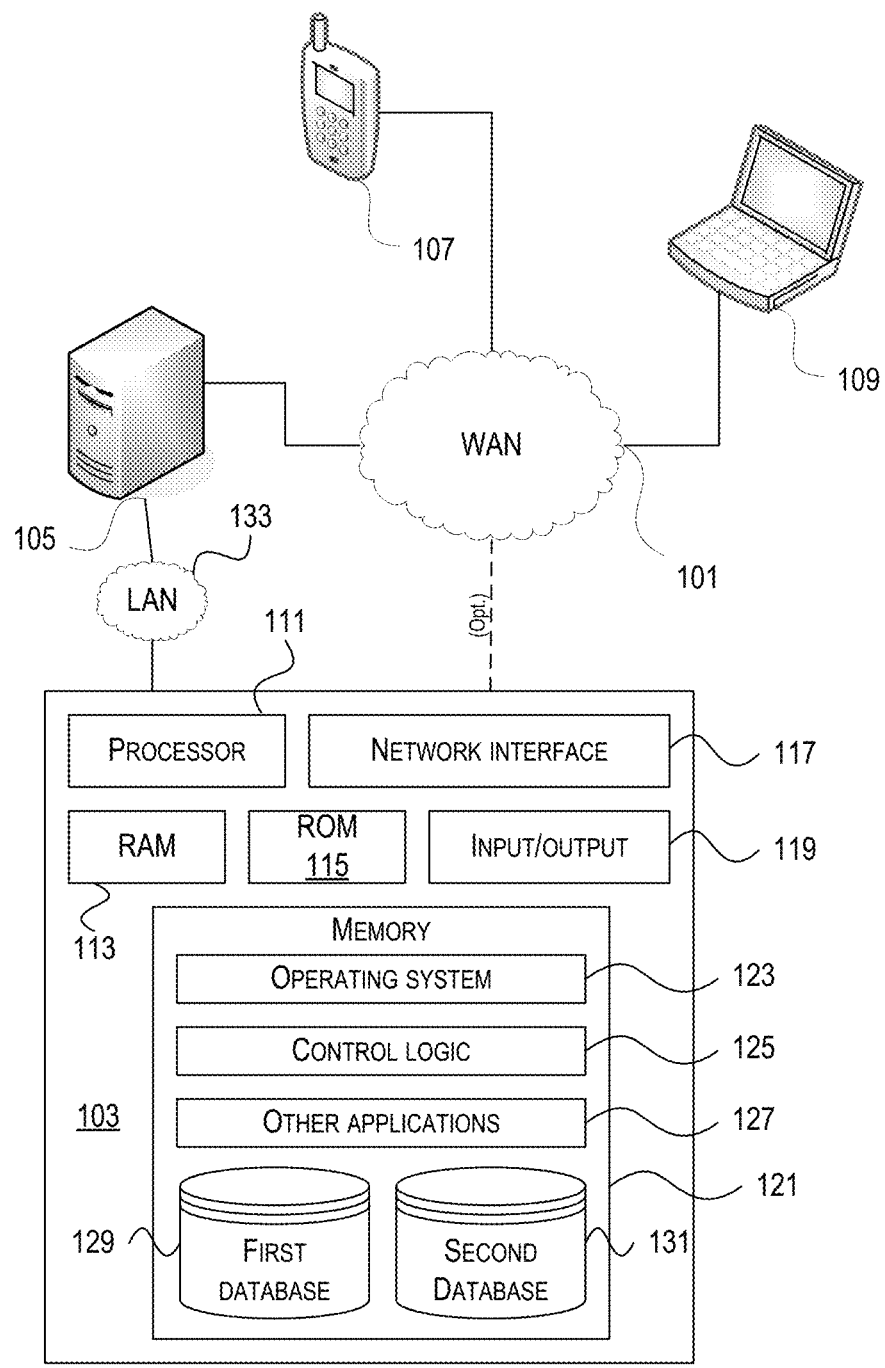
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
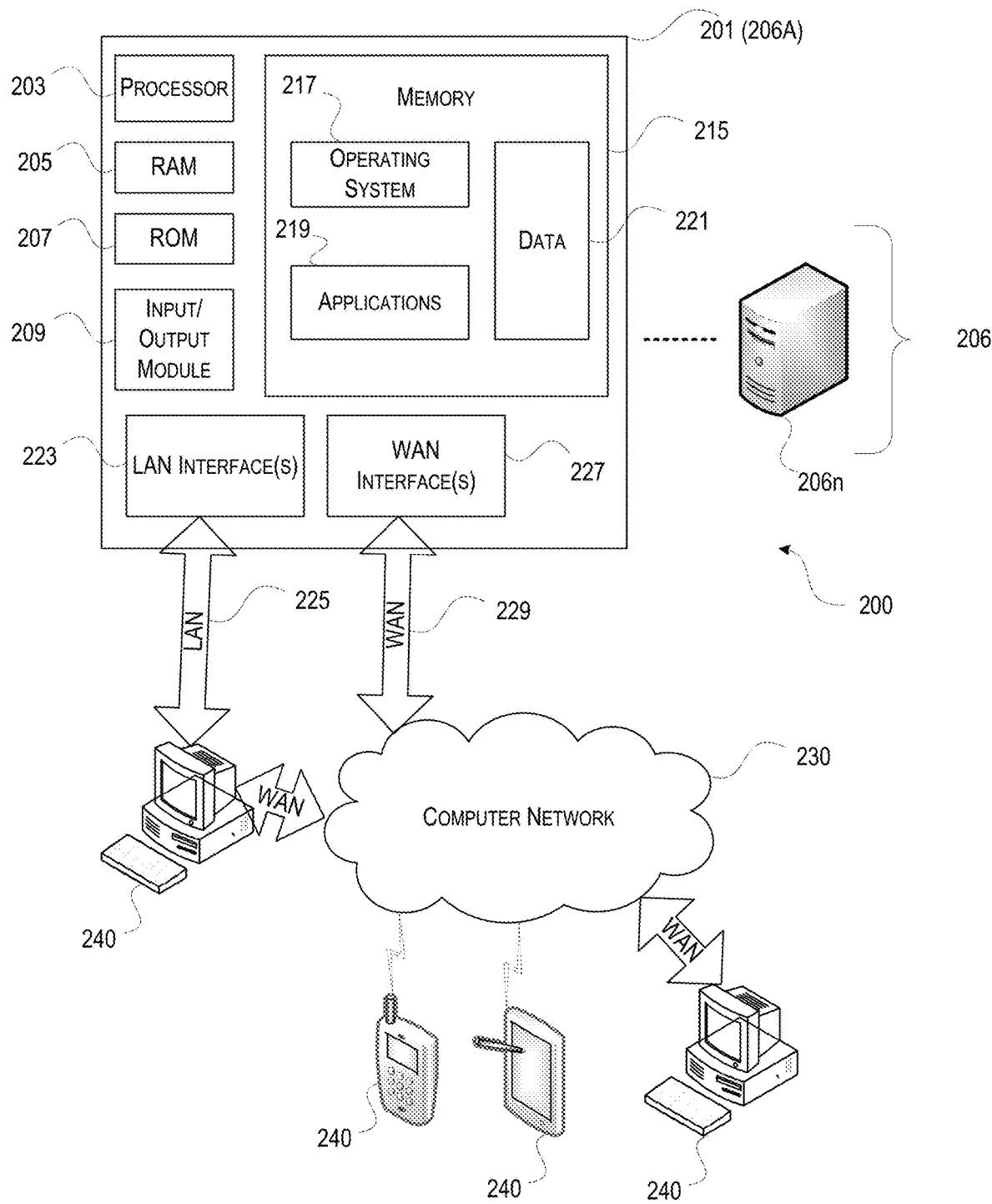
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
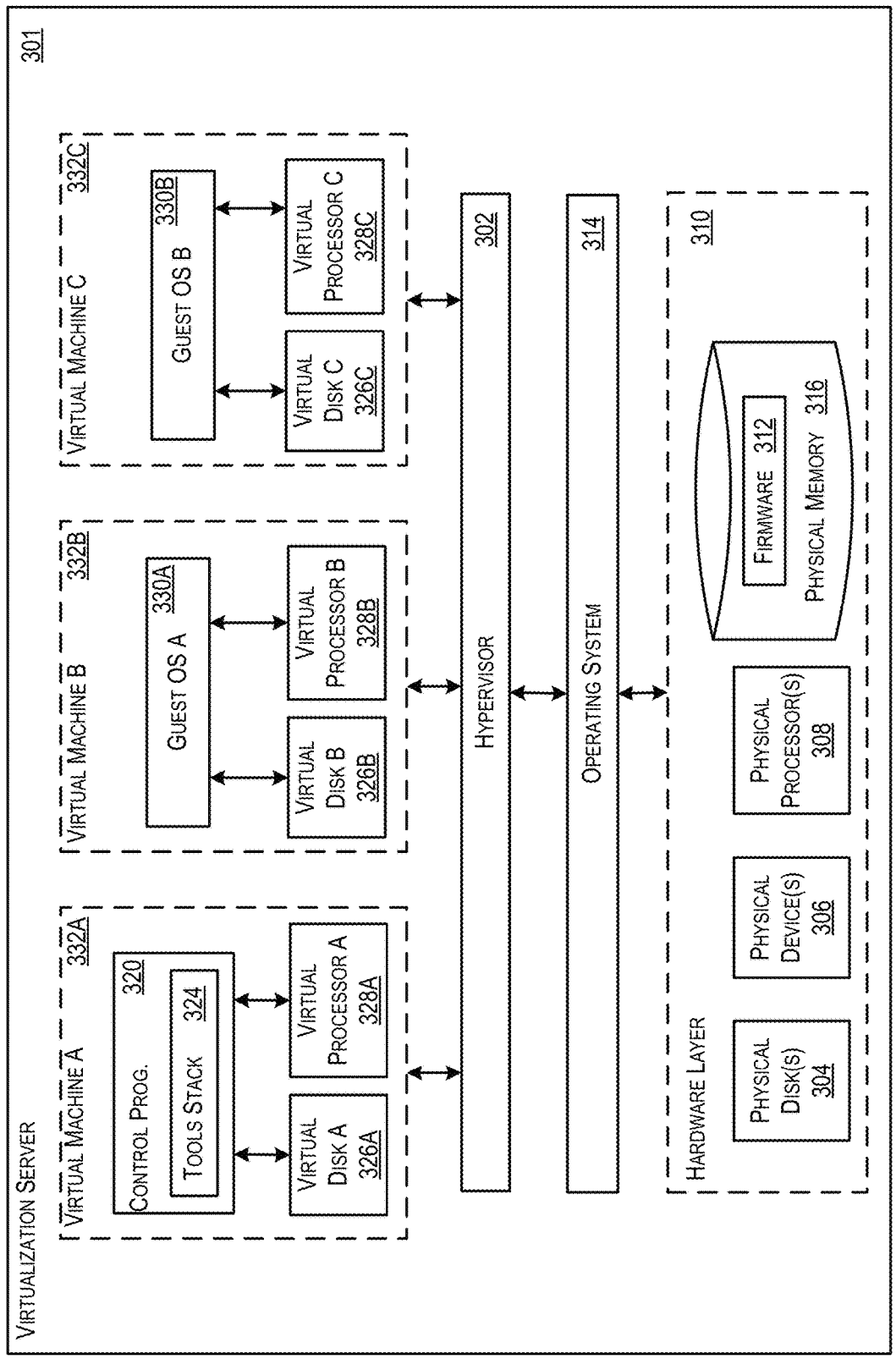
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
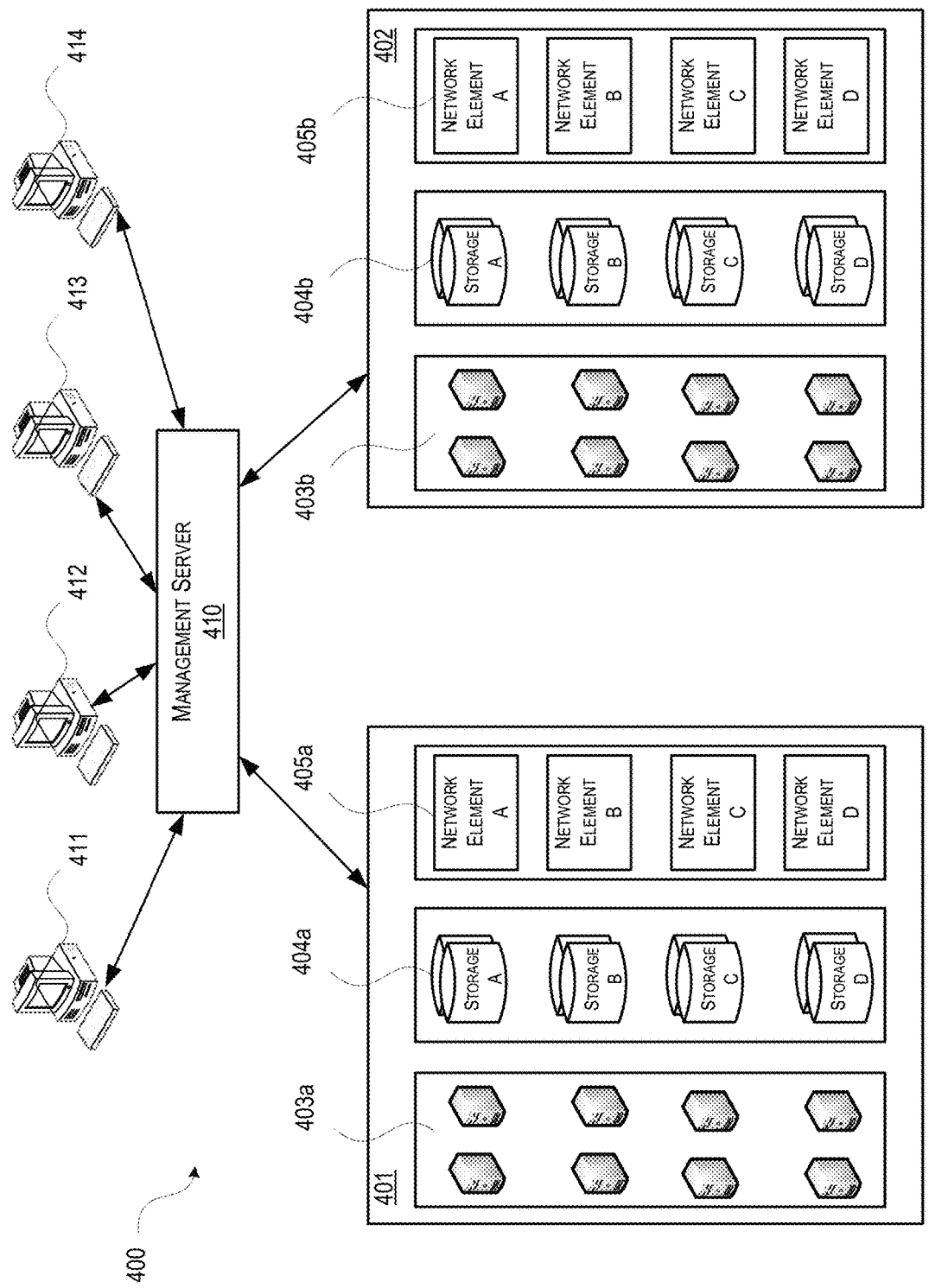
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405 a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
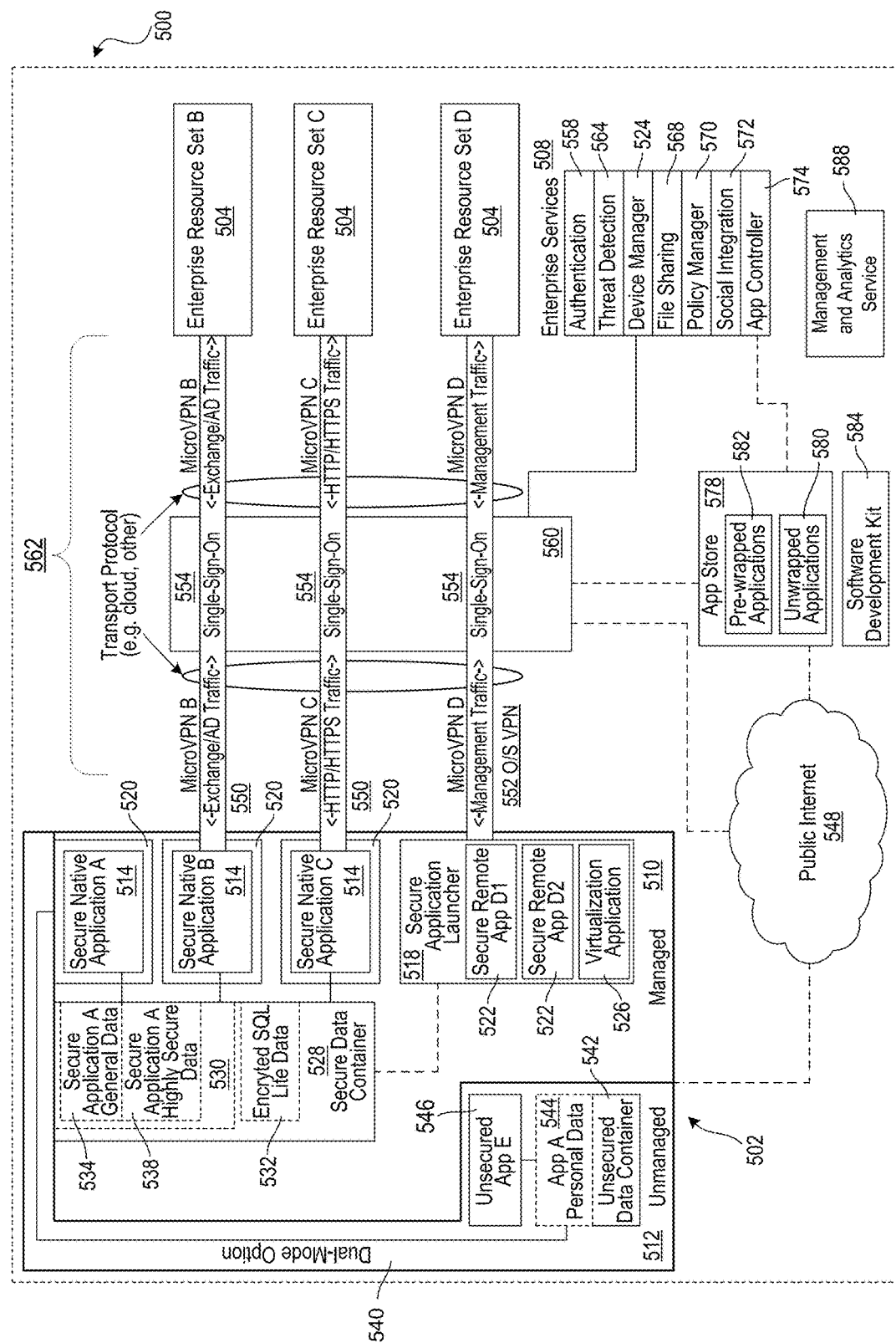
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like.

Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and Analytics Service 588. The management and analytics service 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Canary Deployment Using an Application Delivery Controller

As discussed above, some aspects of the present disclosure relate to canary deployment and the use of an application delivery controller of a cloud-computing environment to improve the canary deployment. Examples of canary deployment and the use of an application delivery controller, along with other aspects, will be discussed in connection with FIGS. 6-9.

Figure 6:
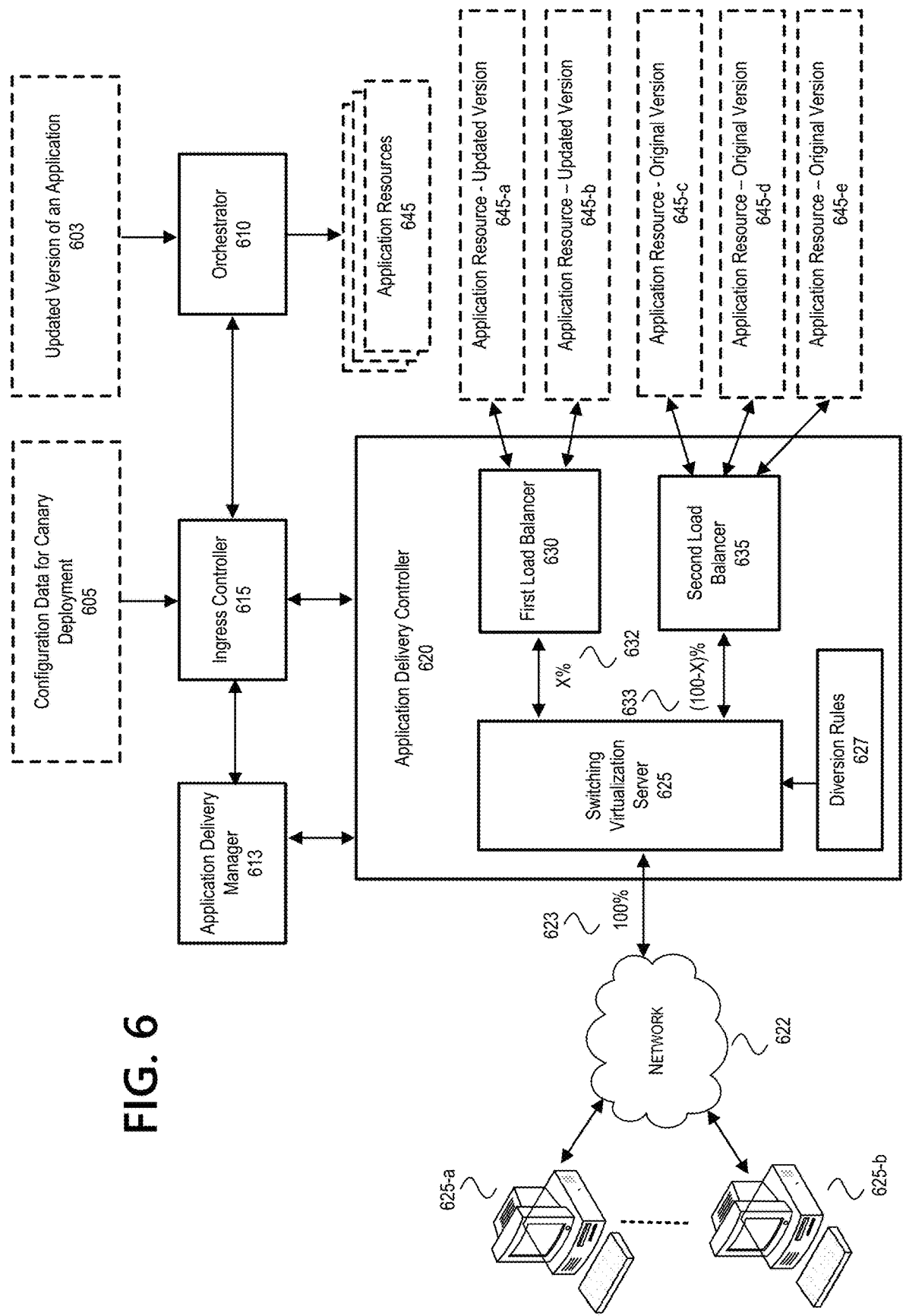
FIG. 6 depicts an illustrative block diagram of a system for application deployment in accordance with one or more aspects described herein.

FIG. 6 depicts an illustrative block diagram of a system for application deployment. In particular, FIG. 6 depicts an example cloud-computing environment 600 that includes an orchestrator 610, an ingress controller 615, an application delivery manager 613, and an application delivery controller 620. The cloud-computing environment 600 may provide cloud-based services (e.g., cloud-based application services) to various users at one or more geographic locations. As depicted in FIG. 6, the various users are represented by computing devices 625-*a* to 625-*b*, which are in communication with the application delivery controller 620 via network 622. The computing devices 625-*a* to 625-*b* may be any of the client, remote, or mobile devices discussed in connection with FIGS. 1-5 (e.g., terminals 240 of FIG. 2; client computers 411-414 of FIG. 4; a mobile device 502 of FIG. 5). Network 622 may be any of the networks discussed in connection with FIGS. 1-5 (e.g., network 230 of FIG. 2; public internet 548 of FIG. 5). FIG. 6 depicts the cloud-computing environment 600 in a simplified manner for clarity and the cloud-computing environment 600 may include other devices not shown by FIG. 600, including one or more devices described in connection with FIGS. 1-5. For example, the computing devices 625-*a* to 625-*b* may be in communication with the application delivery controller 620 via a gateway (e.g., gateway 554 of FIG. 5). Accordingly, the cloud-computing environment 600 may include a gateway.

FIG. 6 depicts the orchestrator 610, the ingress controller 615, the application delivery manager 613, and the application delivery controller 620 being used to enable and/or perform the canary deployment of an updated version of an application within the cloud-computing environment 600. By way of introduction and as depicted in FIG. 6, the orchestrator 610 may receive an updated version 603 of the application, and the ingress controller 615 may receive configuration data 605 for the canary deployment. The orchestrator 610 may configure one or more application resources 645 (e.g., application resources 645-*a* to 645-*e*) based on the updated version 603 of the application. The ingress controller 615 may configure the application delivery controller 620 based on the configuration data 605 for the canary deployment. The application delivery controller 620, as part of performing the canary deployment, may divert or otherwise forward traffic 623 received from the computing devices 625-*a* to 625-*b* to the application resources 645. To perform the various orchestration, ingress, and delivery processes of the orchestrator 610, ingress controller 615, and the application delivery controller 620, a virtualization technology may be used. For example, Kubernetes is an open-source container-based platform that may be used by the cloud-computing environment 600. Examples of how Kubernetes may be used in connection with the canary deployment and the components of the cloud-computing environment are identified below. Additionally, Kubernetes is used only as an example of the virtualization technology that may be used to facilitate the canary deployment of an application in a cloud-computing environment. Other virtualization technologies may be used including, for example, technologies based on Apache Mesos or Docker.

The orchestrator 610 may be configured to provision application resources. For example, the orchestrator 610 may be configured to configure, provision, add, or remove application resources from the cloud-computing environment 600. As depicted in FIG. 6, the orchestrator 610 may receive an updated version 603 of an application. Based on the updated version 603, the orchestrator 610 may configure, provision, and/or add one or more application resources 645. In this way, application resource 645-*a* and application resource 645-*b* may be configured to execute the updated version 603 of the application and may be available to receive traffic associated with the application. Application resources 649-*c* to 645-*e* may have been previously configured by the orchestrator 610 to execute the original version of the application and may have been receiving all traffic associated with the application. The application may be any of the enterprise resources or enterprise services described in connection with FIG. 5 (e.g., enterprise resources 504; enterprise services 508), or any other service being provided by the cloud-computing environment 600.

The application resources 645 may be executing or otherwise configured on physical computing resources. For example, the application resources may be executing or otherwise configured on a server or other type of physical computing device described in connection with FIGS. 1-5 (e.g., servers 103 and 105 of FIG. 1; servers 206*a* to 206*n* of FIG. 2; virtualization server 301 of FIG. 3 based on hardware layer 310; any physical device configured as one or more of the host servers 403*a* and 403*b*, storage elements 404*a* and 404*b*, and network elements 405*a* and 405*b* of FIG. 4; and any physical device configured as one or more of the enterprise resources 504 or the enterprise services 508 of FIG. 5).

The application resources 645 may be virtualized and/or containerized (e.g., virtualization server 301 of FIG. 3). As an example, the application resources 645 may be implemented as containers in accordance with Kubernetes. As an example, based on Kubernetes, each of the application resources 645 may be configured inside its own container, and each container may have its own filesystem, CPU, memory, and the like. The containers may share an operating system. In this way, FIG. 6 may be viewed as depicting five example containers (e.g., one container for each of application resources 645-a to 645-e). Two of the five containers, which are depicted in FIG. 6 as application resource 645-a and 645-b, may be configured to execute the updated version 603 of the application. Three of the five containers, which may be depicted by FIG. 6 as application resources 645-c to 645-e, may be configured to execute the original version of the application. By using the containers, the updated version 603 of the application may be deployed by the cloud-computing environment 600 separately from the original version of the application. The number of containers (e.g., five) is meant only as an example. The orchestrator may be able to configure, provision, or add any number of containers for the updated version 603 of the application or the original version of the application. In general, the number of containers may depend on the amount of traffic associated with the application that is received by the cloud-computing environment 600.

The application delivery manager 613 may be configured to collect and analyze metrics associated with performance of the application resources. For example, the application delivery manager 613 may receive one or more metrics associated with performance of the application resources 645 (e.g., metrics that indicate whether an application resource is busy, indicate whether an application resource is unavailable, indicate a processing time of an application resource, indicate whether data is waiting to be processed by an application resource, and the like). One or more of the metrics may be collected from the application delivery controller 620. These metrics may be used to determine a status of the canary deployment. The status may indicate, for example, whether to continue the canary deployment and/or whether the canary deployment has failed. In some instances, the application delivery manager 613 may be configured to collect and analyze the metrics in an automated fashion. For example, the application delivery manager may be configured with a Spinnaker service that automatically determines a status of the canary deployment. The Spinnaker service is an open-source software platform that is usable in a cloud-computing environment. The ingress controller 615 may be similarly configured with a Spinnaker service such that the ingress controller 615 may be used to analyze the metrics in an automated fashion instead of the application delivery manager 613. The application delivery manager 613 may be a Citrix Application Delivery Manager (ADM) by Citrix Systems, Inc.

The ingress controller 615 may be configured to communicate with the orchestrator 610, the application delivery manager 613, and the application delivery controller 620. In this way, the ingress controller 615 may initiate and manage the canary deployment of the updated version 603 of the application. For example, the ingress controller 615 may receive, from the orchestrator 610, an indication that the updated version 603 of the application is deployed in the cloud-based environment 600. This indication may be used as a basis for initiating the canary deployment of the updated version 603 of the application. The ingress controller 615 may receive, from the application delivery manager 613, an indication of a status for the canary deployment. This indication may be used as a basis for continuing, stopping or completing the canary deployment. Continuing, stopping or completing the canary deployment may include reconfiguring the application delivery controller 620 and/or sending a signal to the orchestrator 610 to reconfigure the application resources 645.

The ingress controller 615 may be virtualized and/or containerized. For example, the ingress controller 615 may be configured as part of a Kubernetes cluster. Based on being part of the Kubernetes cluster, any communication from the orchestrator 610 and/or the application delivery controller 620 may take the form of a Kubernetes event. Accordingly, the ingress controller 615 may be configured to listen for Kubernetes events from the orchestrator 610 and/or the application delivery controller 620. The ingress controller 615 may be a Citrix Ingress Controller by Citrix Systems, Inc.

The ingress controller 615 may be configured to receive configuration data 605 for the canary deployment of the updated version 603 of the application. The configuration data 605 may include information as to how the canary deployment is to be performed. For example, the configuration data 605 may include information on the stages for the canary deployment. As canary deployment generally involves increasing the exposure of the updated version 603 to traffic over time, the canary deployment may be performed in stages. Accordingly, the configuration data 605 may include an indication of how long a stage should be performed (e.g., 30 minutes) and an indication of how much traffic that is being diverted or forwarded to the application resources that execute the updated version of the application is to increase from stage-to-stage (e.g., 25%). The configuration data 605 may include identification tags for the updated version 603 of the application and the original version of the application. The configuration data 605 may include information that restricts the canary deployment to particular users or geographic locations (e.g., the canary deployment is only for users located in North America; the canary deployment is only for users within a specified IP address range). The configuration data 605 may include information indicating a component of the cloud-computing environment that is to analyze metrics associated with the canary deployment and determine a status of the canary deployment (e.g., the application delivery manager 613). Accordingly, the ingress controller 615 may communicate with the component of the cloud-computing environment that is to analyze metrics associated with the canary deployment and determine a status of the canary deployment. The communication may include information extracted from the configuration data 605 including, for example, indications as to how the status of the canary deployment is to be determined. The configuration data 605 may have been authored by an operator of the cloud-computing environment 600. Additional details and examples of the configuration data 605 are provided below including, for example, in connection with FIG. 8.

The ingress controller 615 may be configured to be able to cause configuration of the application delivery controller 620. In this way, the ingress controller 615 may be able to manage the canary deployment by, for example, causing configuration of the application delivery controller 620 if the canary deployment is initiated, if the canary deployment continues, and/or if the canary deployment fails. FIG. 6 depicts one example configuration of the application delivery controller 620. As depicted, the application delivery controller 620 is configured with a switching virtualization server 625, diversion rules 627, a first load balancer 630, and a second load balancer 635. The switching virtualization server 625 may receive, via network 622, traffic associated with the application from computing devices 620-*a* to 620-*b*. The switching virtualization server 625 may determine how the received traffic is to be diverted or forwarded to the load balancers 630 and 635 based on the diversion rules 627. The diversion rules 627 may be based on the configuration data 605 and the current stage of the canary deployment. For example, the configuration data 605 may indicate properties of the stages for the canary deployment and may indicate an amount of traffic that should increase from stage-to-stage. Based on these indications included in the configuration data 605 and the current stage of the canary deployment, ingress controller 615 may determine the diversion rules 627. As an example, the diversion rules 627 may indicate a percentage of traffic to divert or forward to the first load balancer 630 (e.g., 25% of traffic diverted if the current stage is the first stage, and 50% of traffic diverted if the current stage is the second stage). The diversion rules 627 may indicate one or more other restrictions on diverting or forwarding traffic to the first load balancer 630 (e.g., divert or forward only if from a user in a specific geographic location and/or from a computing device within a specified IP address range).

As one example, the switching virtualization server 625 may receive traffic 623 that is associated with the application (e.g., 100% of traffic received by the switching virtualization server 625 in association with the application). Based on the diversion rules 627, the switching virtualization server 625 may determine that a first portion 632 of the traffic 623 (e.g., X % of the traffic 623) is to be diverted or forwarded to the first load balancer 630. Accordingly, the switching virtualization server 625 may determine to divert or forward a second portion 633 (or the remaining portion) of the traffic 623 (e.g., 100-X % of the traffic 623) to the second load balancer 635. Upon receipt of the first portion 632, the first load balancer 630 may determine which of application resources 645-*a* and 645-*b* are to receive the first portion 632. The first load balancer 630 may perform this determination using any suitable load balancing technique, and the load balancing technique may provide for sticky or non-sticky sessions based on the configuration data 605. The first portion 632 may be further divided into a sub-portion sent to application resource 645-*a* and a sub-portion sent to application resource 645-*b*. Upon receipt of the second portion 633, the second load balancer 635 may determine which of application resources 645-*c*, 645-*d*, and 645-*e* are to receive the second portion 633. The second load balancer 635 may perform this determination using any suitable load balancing technique, and the load balancing technique may provide for sticky or non-sticky sessions based on the configuration data 605. The second portion 635 may be further divided into a sub-portion sent to application resource 645-*c*, a sub-portion sent to application resource 645-*d*, and/or a sub-portion sent to application resource 645-*e*.

The application delivery controller 620 may be virtualized and/or containerized. For example, the application delivery controller 620 may be configured as part of a Kubernetes cluster (e.g., the same Kubernetes cluster as the ingress controller 615). The application delivery controller 620 may be a container-based application delivery controller such as Citrix Application Delivery Controller CPX by Citrix Systems, Inc.

Figure 7B:
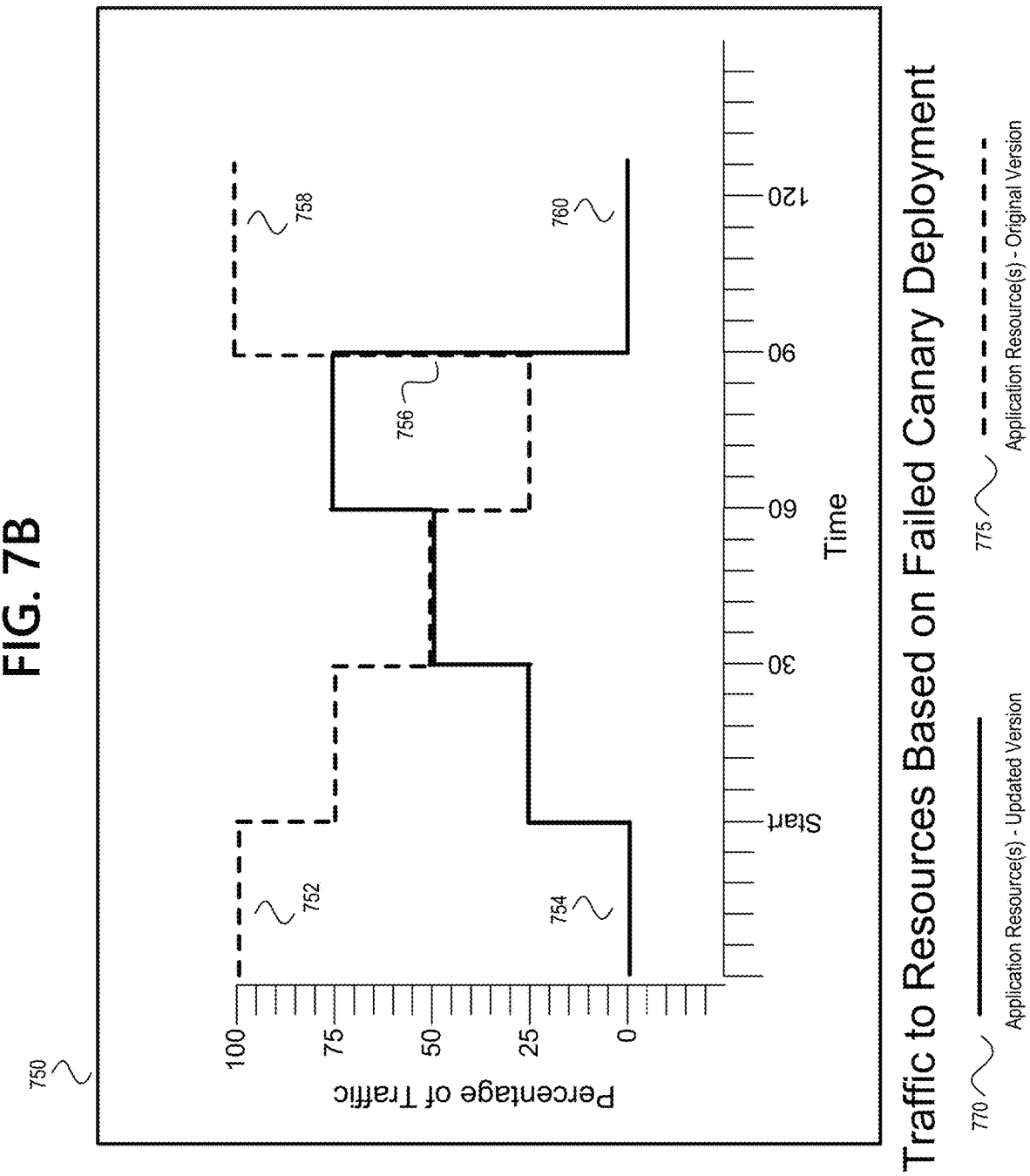

As mentioned above, the canary deployment may be performed in stages (e.g., each stage may be performed for 30 minutes). As the canary deployment proceeds from stage to stage, the application delivery manager 613 may determine whether to continue the canary deployment and/or whether the canary deployment has failed. These determinations may be performed based on the configuration data 605 for the canary deployment and/or based on any metrics associated with the performance of the application resources 645. Based on the determination(s), the ingress controller 615 may configure the application delivery controller 620 to change how the traffic is diverted or forwarded to the load balancers 630 and 635. For example, if the canary deployment is to continue to the next stage, the ingress controller 615 may, based on the configuration data 605, determine one or more diversion rules that will cause the application delivery controller 620 to divert or forward an increased amount of traffic to the first load balancer 630. The ingress controller 615 may then cause the application delivery controller 620 to be reconfigured with the one or more diversion rules. In this way, the canary deployment may proceed by increasing exposure of the updated version 603 in a stage-by-stage fashion. As another example, if the canary deployment failed, the ingress controller 615 may determine one or more diversion rules that will cause the application delivery controller 620 to stop diverting or forwarding any traffic to the first load balancer 630. The ingress controller 615 may then cause the application delivery controller 620 to be reconfigured with these one or more diversion rules. In this way, the canary deployment can be stopped upon a failure of the updated version 603 to perform as expected, and all traffic can be diverted or forwarded to application resources that execute the original version. FIGS. 7A and 7B provide graphical examples of the canary deployment in accordance with the example cloud-computing environment 600 depicted in FIG. 6. Indeed, FIGS. 7A and 7B provide graphical examples depicting changes in the amount of traffic being forwarded or diverted to the application resources based on successful and failed canary deployments.

For example, FIG. 7A depicts an example 700 of a successful canary deployment. In example 700 and as indicated at 720, a solid line indicates the amount of traffic being diverted or forwarded to the application resources that execute the updated version of the application. For clarity and in accordance with the example cloud-computing environment 600 of FIG. 6, the remaining discussion of example 700 will refer to the application resources that execute the updated version of the application as application resources 645-*a* and 645-*b*. In example 700 and as indicated at 725, a dashed line indicates the amount of traffic being diverted or forwarded to the application resources that execute the original version of the application. For clarity and in accordance with the example cloud-computing environment 600 of FIG. 6, the remaining discussion of example 700 will refer to the application resources that execute the original version of the application as application resources 645-*c* to 645-*e*.

In the depicted example 700, the canary deployment may take place over four stages. Each stage may last for 30 minutes. For each stage, the updated version 603 may be diverted or forwarded an increase of 25% more traffic than the prior stage. More fully, assume that the graph begins after the orchestrator 610 has configured the application resources 645-*a* to 645-*e* as depicted in FIG. 6. As indicated at 702, prior to starting the canary deployment, all traffic (e.g., 100%) associated with the application may be forwarded, via the application deployment controller 620, to the application 645-*c* to 645-*e*. As indicated at 704, none of the traffic associated with the application may be forwarded, via the application deployment controller 620, to the application resources 645-*a* and 645-*b*.

In the depicted example 700, the first stage of the canary deployment may begin where the graph indicates "Start" (e.g., time zero of the canary deployment). Based on the configuration data 605, the ingress controller 615 may cause configuration of the application deployment controller 620 such that 25% of the traffic associated with the application may diverted or forwarded to the application resources 645-*a* and 645-*b*. The application delivery controller 620 may divert or forward the remaining 75% of the traffic associated with the application to the application resources 645-*c* to 645-*e*. This first stage may continue for 30 minutes. When the 30 minutes are elapsed, the application delivery manager 613 may determine a status for the canary deployment that indicates to continue the canary deployment. This determination may be performed based on any metrics associated with performance of the application resources. For example, a metric may indicate that the enterprise resources 645-*a* and 645-*b* did not return any error code greater than 500. Based on the enterprise resources 645-*a* and 645-*b* not returning any error code greater than 500, the application delivery manager 613 may determine the status for the canary deployment that indicates to continue the canary deployment. To provide an indication of the status to the ingress controller 615, the application delivery manager 613 may send, to the ingress controller 615, an indication of the status (e.g., by sending an update to the configuration data 605 that includes the indication of the status; or by sending a message that includes the indication of the status). Based on this status and based on the amount of the traffic associated with the application being diverted or forwarded to the application resources 645-*a* and 645-*b* being less than 100%, the canary deployment may continue. Continuing the canary deployment may include, for example, increasing an amount of traffic being diverted or forwarded to the application resources 645-*a* and 645-*b*. To increase the amount of traffic, the ingress controller 615 may configure the application delivery controller 620 with one or more diversion rules for the second stage. Accordingly and as depicted in the graph from time 30 to 60, the application delivery controller 620, based on the one or more diversion rules for the second stage, may divert or forward 50% of the traffic associated with the application to the application resources 645-*a* and 645-*b*. The application delivery controller 620 may divert or forward the remaining 50% of the traffic associated with the application to the application resources 645-*c* to 645-*e*.

In the depicted example 700, this process of continuing the canary deployment and causing the application delivery controller 620 to increase an amount of traffic being diverted or forwarded to the application resources 645-*a* and 645-*b* may be repeated for two more stages. As depicted in the example 700, a third stage for the canary deployment may be performed from time 60 to 90; and a fourth stage for the canary deployment may begin at time 90. As indicated at 706, at the end of the 30 minutes for the fourth stage (e.g., time 120), the application delivery controller 620 may be diverting or forwarding all of the traffic associated with the application to the application resources 645-*a* and 645-*b*. As indicated at 708, the application delivery controller 708 may not be diverting or forwarding any traffic associated with the application to the application resources 645-*c* to 645-*e*. Based on 30 minutes of the fourth stage elapsing, application delivery manager 613 may determine to not continue the canary deployment. This determination may be based on the amount of the traffic associated with the application being diverted or forwarded to the application resources 645-*a* and 645-*b* being equal to 100%. Based on this determination, the ingress controller 615 may complete the canary deployment. Completing the canary deployment may include, for example, sending a signal to the orchestrator 610 that causes the orchestrator to configure the application resources 645 based on completion of the canary deployment. For example, based on the signal, the orchestrator 610 may remove the application resources 645-*c* to 645-*e*, or otherwise make those application resources unavailable to receive any traffic. As another example, FIG. 7B depicts an example 750 of a failed canary deployment. In the example 750 and as indicated at 770, a solid line indicates the amount of traffic being diverted or forwarded to the application resources that execute the updated version of the application. For clarity and in accordance with the example cloud-computing environment 600 of FIG. 6, the remaining discussion of example 750 will refer to the application resources that execute the updated version of the application as application resources 645-*a* and 645-*b*. In the example 750 and as indicated at 775, a dashed line indicates the amount of traffic being diverted or forwarded to the application resources that execute the original version of the application. For clarity and in accordance with the example cloud-computing environment 600 of FIG. 6, the remaining discussion of example 750 will refer to the application resources that execute the original version of the application as application resources 645-*c* to 645-*e*

In the depicted example 750, the canary deployment may take place over four stages. Each stage may last for 30 minutes. For each stage, the updated version 603 may be diverted or forwarded an increase of 25% more traffic than the prior stage. More fully, assume that the graph begins after the orchestrator 610 has configured the application resources 645-*a* to 645-*e*. As indicated at 752, prior to starting the canary deployment, all traffic (e.g., 100%) associated with the application may be forwarded, via the application deployment controller 620, to the application resources 645-*c* to 645-*e*. As indicated at 754, none of the traffic associated with the application may be forwarded, via the application deployment controller 620, to the application resources 645-*a* and 645-*b*.

In the depicted example 750, the first stage of the canary deployment may begin where the graph indicates "Start" (e.g., time zero of the canary deployment). The first three stages of the canary deployment of the example 750 may proceed similarly to the first three stages of the example 700 of FIG. 7A. As shown in the example 750, during the first stage (e.g., from "Start" to time 30), the application delivery controller 620 may be diverting or forwarding 25% of the traffic associated with the application to the application resources 645-*a* and 645-*b*. During the second stage (e.g., from time 30 to time 60), the application delivery controller 620 may be diverting or forwarding 50% of the traffic associated with the application to the application resources 645-*a* and 645-*b*. During the third stage (e.g., from time 60 to 90), the application delivery controller 620 may be diverting or forwarding 75% of the traffic associated with the application to the application resources 645-*a* and 645-*b*.

At the end of the third stage, the depicted example 750 differs from the example 700. For example, based on 30 minutes of the third stage elapsing, the application delivery manager 613 may, based on a status of the canary deployment, determine to not continue the canary deployment and/or determine that the canary deployment has failed. The status of the canary deployment may be determined based on any metrics associated with the performance of the application resources. As an example, the application resources 645-*a* and 645-*b* may have stopped responding (e.g., due to an error in the updated version 603, which may have caused the application to crash or hang in an infinite loop). The application delivery controller 620 (or some other component of the cloud-based computing environment 600) may have determined one or more metrics based on lack of response (e.g., one or more metrics that indicate the application resources were busy and/or indicate that the application resources were unavailable). As an example, the application delivery controller 620 may determine counts of error codes greater than 500 returned by the enterprise resources. The application delivery controller 613 may collect these counts and use these counts as a basis for determining the status of the canary deployment. As an example, the application delivery manager 613 may compare the counts to each other. If the counts for the enterprise resources 645-*a* and 645-*b* indicate a greater number of returned error codes than the counts for the enterprise resources 645-*c* to 645-*e*, then the application delivery manager 613 may determine a status for the canary deployment that indicates failure. Based on the status indicating failure, the canary deployment may be stopped. For example and based on the example 750 at 756, stopping the canary deployment may include configuring the application delivery controller 620 to stop diverting or forwarding traffic to the application resources 645-*a* and 645-*b*. Accordingly, as indicated at 758, after time 90, the application delivery controller 620 may divert or forward all traffic (e.g., 100% of traffic) associated with the application to the application resources 645-*c* to 645-*e*. As indicated at 760, after time 90, the application delivery controller 620 may divert or forward no traffic associated with the application to the application resources 645-*a* and 645-*b*. Stopping the canary deployment may include, for example, sending a signal to the orchestrator 610 that causes the orchestrator to configure the application resources 645 based on a failure of the canary deployment. For example, based on the signal, the orchestrator 610 may remove the application resources 645-*a* and 645-*b* or otherwise make those application resources unavailable to receive any traffic.

The above examples 700 and 750 discusses example metrics (e.g., counts of error codes greater than 500 returned by the enterprise resources) that is used as a basis for determining whether to continue the canary deployment and/or whether the canary deployment has failed. Additional example metrics are discussed in connection with FIG. 9.

Based on the above examples 700 and 750 and in view of the example cloud-computing environment 600, canary deployments can be performed in a cloud-computing environment in an automated fashion. In this way, example 700 depicts performance of an example canary deployment in an automated fashion from at least a beginning of the canary deployment to a successful completion of the canary deployment. Example 750 depicts performance of an example canary deployment in an automated fashion from at least a beginning of the canary deployment to the stopping of the canary deployment based on a failure. When performing a canary deployment in an automated fashion, no human input is needed by the various components of the cloud-computing environment in connection with the canary deployment.

Figure 8:
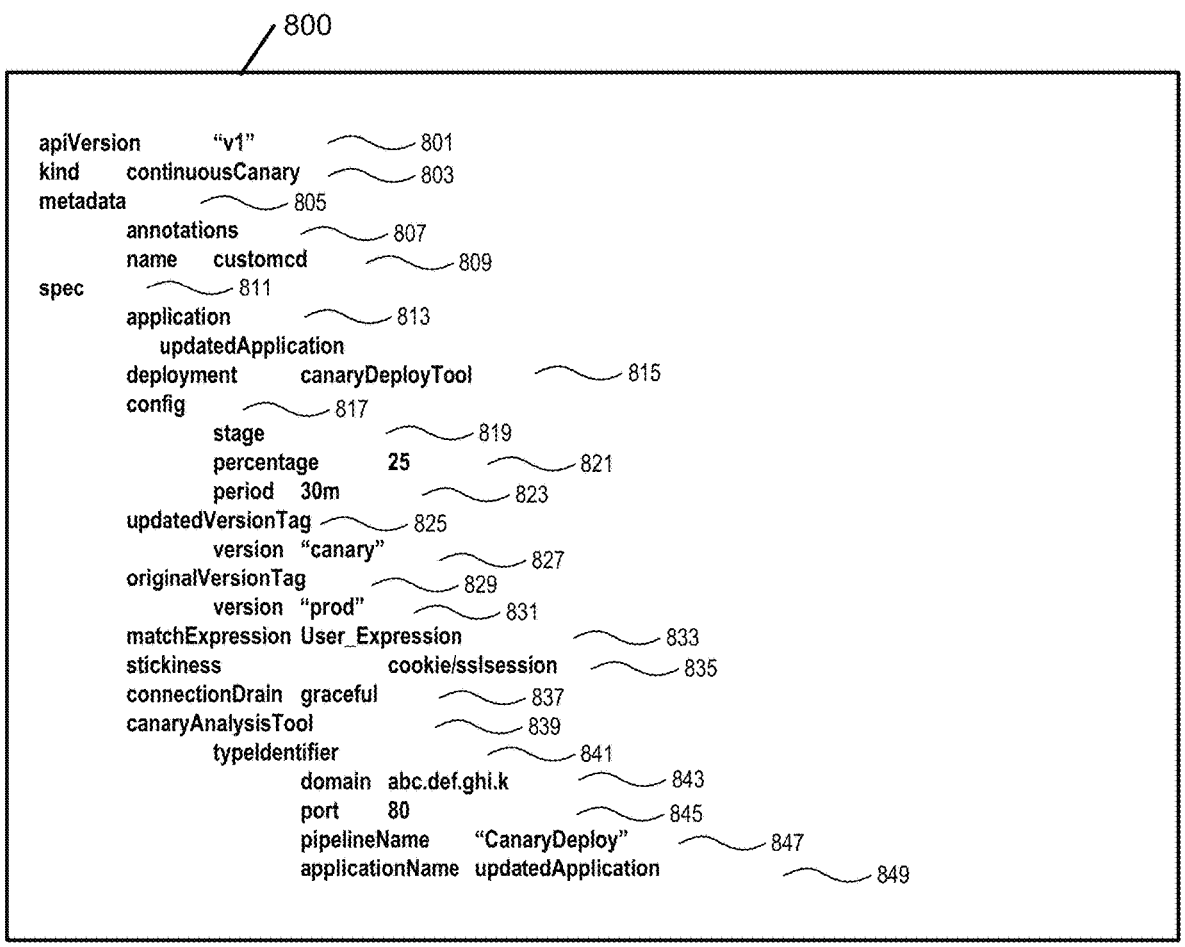
FIG. 8 depicts an example configuration for application deployment in accordance with one or more aspects described herein.

Additionally, the above examples 700 and 750 may be based on the same, or similar, configuration data for the canary deployment. For example, both examples 700 and 750 attempt to perform a canary deployment that includes four stages, where each stage takes 30 minutes and each stage increases the amount of traffic being diverted to the application resources that execute the updated version by 25%. FIG. 8 provides an example of configuration data for canary deployment that is in accordance with the examples 700 and 750 of FIGS. 7A and 7B, and is in accordance with the configuration data 605 of the example cloud-computing environment 600 depicted in FIG. 6.

For example, FIG. 8 depicts an example configuration data 800 that may be used as a basis for performing the examples 700 and 750 of FIGS. 7A and 7B. The example configuration data 800 includes a number of data fields that include information as to how the canary deployment is to be performed. Table I provides details on the example configuration data 800. More fully, Table I provides details on the example data fields shown in the example configuration data 800 by associating the reference numbers of the example configuration data 800, with the labels for the example data fields depicted by the example configuration data 800, with any values for the example data fields depicted by the example configuration data 800, and with a description of the example data fields. If the example data field does not have a value in the example configuration data 800, the column for the value is left intentionally blank, but may have a value in other examples of the configuration data. If the example data field does have a value in the example configuration data 800, the value is intended as an example and other values may be included in other examples of the configuration data.

TABLE I

| Example Configuration Data 800 | | | |
|---|---|---|---|
| Reference number of the example configuration data 800 | Depicted label of the example data field | Depicted value of the example data field | Description of the example field data |
| 801 | apiVersion | "v1" | This data field may provide an identification of an application programming interface associated with the canary deployment and/or the configuration data |
| 803 | kind | continuous-Canary | This data field may provide an identification of the type of canary deployment that is to be performed. The canary deployment may be |

TABLE I-continued

Example Configuration Data 800

| Reference number of the example configuration data 800 | Depicted label of the example data field | Depicted value of the example data field | Description of the example field data |
|---|---|---|---|
| | | | continuously (e.g., the next stage performed immediately after the previous stage), intermittently (e.g., the next stage is performed after a delay period that begins upon completion of the previous stage), or the like. |
| 805 | metadata | | This data field may indicate that the section with metadata for the configuration data is beginning. |
| 807 | annotations | | This data field may include any comments or other annotations for the configuration data |
| 809 | name | customcd | This data field may indicate the name for the configuration data. |
| 811 | spec | | This data field may indicate that the section with details on the canary deployment is beginning. |
| 813 | application | updated-Application | This data field may indicate an identifier of the application being updated |
| 815 | deployment | canary-DeployTool | This data field may indicate any technologies or tools that assist in performing the canary deployment. For example, this data field may indicate a technology or tool that collects and/or analyzes data associated with the canary deployment, such as a Kayenta service. |
| 817 | config | | This data field may indicate a sub-section that provides properties of the canary deployment is beginning. |
| 819 | stage | | This data field may indicate that a sub-section that provides properties of a stage for the canary deployment is beginning. |
| 821 | percentage | 25 | This data field may indicate an amount of traffic that should increase from stage-to-stage. For example, this data field may indicate that, from stage-to-stage, an amount of traffic diverted or forwarded to the application resources that execute the updated version of the application is to increase by 10%, 25%, 35%, or some other amount. |
| 823 | period | 30 m | This data field may indicate a period of time for performing each stage of the canary deployment. For example, this data field may indicate each stage of the canary deployment is to be performed for 5 minutes, 10 minutes, 30 minutes, or some other amount of time. |
| 825 | updated-VersionTag | | This data field may indicate that a sub-section for defining a tag associated with the updated version of the application is beginning. |
| 827 | version | "canary" | This data field may indicate text that forms the tag associated with the updated version of the application. This tag may be associated with data intended for the application resources executing the updated version of the application or any component that processes data |

TABLE I-continued

Example Configuration Data 800

| Reference number of the example configuration data 800 | Depicted label of the example data field | Depicted value of the example data field | Description of the example field data |
|---|---|---|---|
| | | | intended for the application resources executing the updated version of the application. |
| 829 | original-VersionTag | | This data field may indicate that a sub-section for defining a tag associated with the original version of the application is beginning. |
| 831 | version | "prod" | This data field may indicate text that forms the tag associated with the updated version of the application. This tag may be associated with data intended for the application resources executing the original version of the application or any component that processes data intended for application resources executing the original version of the application. |
| 833 | match-Expression | User_Expression | This data field may indicate one or more restrictions on diverting or forwarding traffic to application resources executing the updated version of the application. For example, this data field may indicate one or more geographic areas or ranges of IP addresses that can be diverted or forwarded to application resources executing the updated version of the application. |
| 835 | stickiness | cookie/sslsession | This data field may indicate one or more mechanisms that enable sticky or non-sticky sessions for load-balancing between the application resources. For example, this data field may indicate load balancing may be performed to provide sticky sessions based on one or more of a cookie, a source IP address, a station identifier, a stateful application, a Secure Sockets Layer (SSL) session, and the like. As an example, this data field may indicate load balancing may be performed to provide non-sticky sessions. |
| 837 | connection-Drain | graceful | This data field may indicate how traffic is to be drained from the application resources. For example, this data field may indicate whether the load balancer is to keep existing connections alive during the canary deployment or whether to disconnect. |
| 839 | canary-Analysis-Tool | | This data field may indicate a section for details associated with performing automated canary analysis. This data field may indicate a technology or tool that automatically collects data associated with the canary deployment being used (e.g., a Kayenta service). |

TABLE I-continued

Example Configuration Data 800

| Reference number of the example configuration data 800 | Depicted label of the example data field | Depicted value of the example data field | Description of the example field data |
|---|---|---|---|
| 841 | type-Identifier | | This data field may indicate a sub-section for communication details on the automated canary analysis. This data field may indicate a technology or tool that, as part of the automated canary analysis, determines a status of the canary deployment (e.g., a Spinnaker service). |
| 843 | domain | abc.def.ghi.k | This data field may indicate a domain name or IP address for communicating with the technology or tool that, as part of the automated canary analysis, determines a status of the canary deployment (e.g., a domain or IP address for communicating with the Spinnaker service). |
| 845 | port | 80 | This data field may indicate a port name for communicating with the technology or tool that, as part of the automated canary analysis, determines a status of the canary deployment (e.g., a port name for communicating with the Spinnaker service). |
| 847 | pipeline-Name | "Canary-Deploy" | This data field may indicate details as to how the automated canary analysis is to determine the status of the canary deployment. For example, if Spinnaker is used, this data field may indicate an identifier of a pipeline for Spinnaker. The pipeline may include configuration for determining the status of the canary deployment. |
| 849 | application-Name | updated-Application | This data field may indicate an identifier of the application being updated. This identifier may be needed for performing the automated canary analysis. |

Having discussed the example cloud-computing environment 600 of FIG. 6, the graphical examples 700 and 750 for canary deployments of FIGS. 7A and 7B, and the example configuration data 800 of FIG. 8, an example methods 900 and 1000 will now be discussed. These example methods may be used, either alone or together, to cause performance of canary deployment by one or more computing devices within a cloud-computing environment. The one or more computing devices may be part of a computing platform and/or the example methods 900 and 1000 may be performed by a computing platform instead of one or more computing devices.

Figure 9:
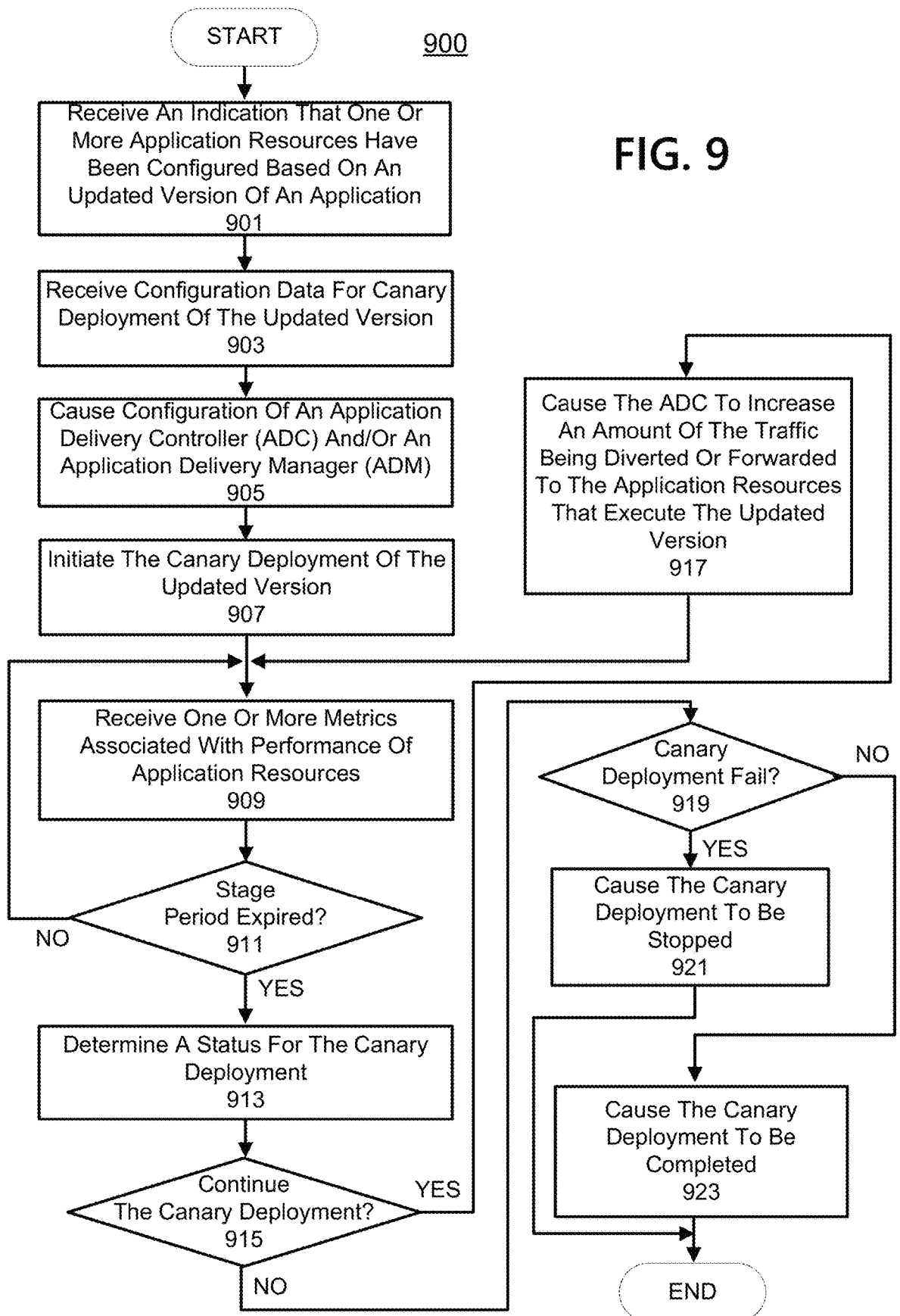
FIGS. 9 and 10 depict illustrative methods for application deployment in accordance with one or more aspects described herein.

FIG. 9 depicts an example method 900 that may perform a canary deployment of an updated version of an application. Method 900 may be implemented by one or more suitable computing devices, as described herein. For example, method 900 may be implemented, in whole or in part, by one or more computing devices configured as an ingress controller (e.g., ingress controller 615), an application delivery controller (e.g., application delivery controller 620), and/or an application delivery manager (e.g., application delivery manager 613). In some instances, the ingress controller, the application delivery controller, and/or the application deployment manager may be implemented on different computing devices (e.g., the ingress controller may be implemented on a first computing device, the application delivery controller may be implemented on the first computing device, and the application deployment manager may be implemented on a second computing device). In other instances, the ingress controller, the application delivery controller, and the application delivery manager may be implemented on the same computing device.

At step 901, the one or more computing devices may receive an indication that one or more application resources have been configured based on an updated version of an application. This indication may be received from an orchestrator (e.g., orchestrator 610). The indication may have been sent by the orchestrator based on the orchestrator receiving the updated version (e.g., updated version 603 of FIG. 6) and successfully configuring one or more application resources that execute the updated version (e.g., enterprise resources 645-a and 645-b of FIG. 6). The indication may include an identifier of the application, a tag associated the updated version of the application, and/or a tag associated with the original version of the application. The application may be any of the enterprise resources or enterprise services described in connection with FIG. 5 (e.g., enterprise resources 504; enterprise services 508), or any other service being provided by a cloud-computing environment (e.g., cloud-computing environment 400 of FIG. 4 or the cloud-computing environment 600 of FIG. 6). At the time the updated version is received, the cloud-computing environment may include application resources that execute an original version of the application (e.g., application resources 645-c to 645-e). At the time the updated version is received and until the canary deployment is initiated, the one or more application resources that execute the original version of the application may receive, process, and respond to all traffic associated with the application (e.g., traffic received from the computing devices 620-a to 620-b of FIG. 6).

At step 903, the one or more computing devices may receive configuration data for canary deployment of the updated version. One example of configuration data is provided by FIG. 8 and further detailed by Table I. Receiving the configuration data may include, for example, retrieving configuration data that is for, or otherwise associated with, the application for which the one or more application resources were configured. This retrieval may be based on matching the identifier included in the indication received at step 901 with one or more data fields in the configuration data. For example, based on the example of FIG. 8, the data field 813 of FIG. 8 may include an identifier that matches an identifier of the application, which may have been included in the indication received at step 901. Data field 825 of FIG. 8 may include a tag that matches a tag associated with the updated version of the application, which may have been included in the indication received at step 901. Data field 829 of FIG. 8 may include a tag that matches the tag associated with the original version of the application, which may have been included in the indication received at step 901.

Additionally, the configuration data (e.g., configuration data 605 of FIG. 6) may include information as to how the canary deployment is to be performed. For example, the configuration data may include information on the stages for the canary deployment (e.g., an indication of how long a stage should be performed and an indication of an amount to increase traffic being diverted to application resources that execute the updated version from stage-to-stage). The configuration data may include identification tags for the updated version of the application and the original version of the application. The configuration data may include information that restricts the canary deployment to particular users or geographic locations (e.g., the canary deployment is only for users located in North America; the canary deployment is only for users within a specified IP address range). The configuration data may include information indicating a component of the cloud-computing environment that is to analyze metrics associated with the canary deployment and determine a status of the canary deployment (e.g., the application delivery manager 613). The configuration data may have been authored by an operator of the cloud-computing environment.

At step 905, the one or more computing devices may cause configuration of an application delivery controller of the cloud-computing environment and/or an application delivery manager of the cloud-computing environment. This step may be performed based on the configuration data received at step 903. For example, the ingress controller (e.g., ingress controller 615) may determine, based on the configuration data, how the canary deployment is to be performed. As an example, the ingress controller may, based on the configuration data, determine one or more diversion rules for the canary deployment. As the canary deployment has not yet begun, the one or more diversion rules may cause the application delivery controller to divert or forward traffic to the one or more application resources in accordance with the first stage of the canary deployment (e.g., divert or forward 25% of traffic based on data field 821 of the example configuration data 800 of FIG. 8). The one or more diversion rules may cause the application delivery controller to divert or forward traffic to the one or more application resources based on whether a user that originated the traffic is in a specific geographic location and/or has a source address in a specified IP address range (e.g., based on data field 833 of the example configuration data 800 of FIG. 8). The ingress controller may send one or more signals to the application delivery controller that cause the application delivery controller to configure itself for canary deployment. The application delivery controller 620 of FIG. 6 provides an example of a configuration for canary deployment. Configuration of the application delivery controller may include, for example, the configuration of a switching virtualization server (e.g., switching virtualization server 625) that receives traffic associated with the application (e.g., traffic 623) and diverts or forwards the traffic based on one or more diversion rules (e.g., diversion rules 627). Configuration of the application delivery controller may include, for example, configuration of a first load balancer (e.g., configure load balancer 630 based on data fields 823-829, 835, and 837 of the example configuration data 800 of FIG. 8) that receives and forwards a first portion of traffic associated with the application (e.g., traffic 632) to the one or more application resources that execute the updated version. Configuration of the application delivery controller may include, for example, configuration of a second load balancer (e.g., configure load balancer 635 based on data fields 823-829, 835, and 837 of the example configuration data 800 of FIG. 8) that receives and forwards a second portion of traffic associated with the application (e.g., traffic 633) to the one or more application resources that execute the original version. The one or more signals may include the one or more diversion rules. Upon receipt, the application delivery controller may store the one or more diversion rules in a location accessible to the switching virtualization server.

Additionally, the ingress controller may send information, based on the configuration data received at step 903, to the application delivery manager (e.g., application delivery manager 613). For example, the configuration data may include information indicating that the application delivery manager is to analyze metrics associated with the canary deployment and determine a status of the canary deployment. Accordingly, the ingress controller may communicate with the application delivery manager. This communication may include information extracted from the configuration data 605 including, for example, indications as to how the status of the canary deployment is to be determined by the application delivery manager. Based on this communication, the application delivery manager may configure itself to collect metrics associated with the application resources (e.g., application resources 645-a to 645-e), analyze the metrics, and determine, based on the analysis, a status of the canary deployment. As an example, the application delivery manager may configure itself based on data fields 815-823 and 839-849 of the example configuration data 800 of FIG. 8.

At step 907, the one or more computing devices may initiate the canary deployment of the updated version. Initiating the canary deployment may be performed based on successful configuration of the application delivery controller and/or the application delivery manager. As an example, upon successfully completing its configuration, the application delivery controller may begin diverting or forwarding a first portion of traffic to one or more application resources that execute the updated version. As an additional example, the application delivery controller may begin diverting or forwarding a second portion of traffic to one or more application resources that execute the original version. As a further example, upon successfully completing its configuration, the application delivery manager may begin collecting metrics associated with performance of the application resources.

Upon initiating the canary deployment, the first stage of the canary deployment may be performed (e.g., from "Start" to time 30 of examples 700 and 750 of FIGS. 7A and 7B). The following steps 909-923 are associated with processes performed by the ingress controller, application delivery controller, and application delivery manager in connection with performing the stages of the canary deployment.

At step 909, the one or more computing devices may receive one or more metrics associated with performance of application resources. For example, the application delivery manager may be configured to collect or otherwise receive one or more metrics associated with the performance of the application resources. The one or more metrics may be determined by the application delivery controller and may indicate various performance indications of the application resources (e.g., indications as to whether an application resource is busy, indications as to whether an application resource is unavailable, indications of a processing time of an application resource, indications as to whether data is waiting to be processed by an application resource, and the like). As an example, the application delivery controller, as it is forwarding portions of traffic to the enterprise resources, may determine counts of error codes received from the application resources. These counts, along with any other metrics determined by the application delivery controller, may be sent to the application delivery manager (e.g., by request of the application delivery manager or periodically). Table II provides examples of metrics that may be determined by the application delivery controller. The application delivery controller may determine the example metrics of Table II for each of the application resources (e.g., application resources 645-*a* to 645-*e*). The examples provided by Table II are not exhaustive. Other examples could be determined by the application delivery controller and/or received by the application delivery manager.

TABLE II

Example metrics

| Example metric | Example symbol name determined by an example Citrix ADC | Description of the example metric |
|---|---|---|
| A count of error codes, received from an application resource, that are greater than 500 | si_tot_svr_busy_err | This example metric may be incremented if the application delivery controller receives, from an application resource, an error code greater than 500. |
| A count of state flips, from up to down, for an application resource | si_tot_state_updown | This example metric may be incremented if the application delivery controller determines a state of the application resource has changed from up (or available) to down (or unavailable). |
| An average time to first byte for an application resource | si_avg_svr_ttfb | This example metric may indicate the average time to the first byte between the application delivery controller and an application resource. |
| A count of requests waiting in a queue for the application resource | si_cur_vsrvsurgeCnt | This example metric may indicate a number of requests waiting in a queue (e.g., a surge queue) for the application resource. This metric may indicate the current number of requests or the maximum number of requests. |

At step 911, the one or more computing devices may determine whether the stage for the canary deployment has expired. This determination may be performed based on the configuration data received at step 903. For example, the application delivery manager may determine that the stage for the canary deployment has been performed for at least equal to a period of time for performing each stage of the canary deployment (e.g., data field 823 of the example configuration 800 of FIG. 8). If the stage has expired, the method may proceed to step 913. If the stage has not expired, the method may return to step 909 to continue receiving additional metrics associated with performance of the application resources.

At step 913, the one or more computing devices may determine a status for the canary deployment. The status for the canary deployment may indicate, for example, whether the canary deployment has failed. This determination may be performed based on an analysis of any metrics received at step 909. In other words, the status for the canary deployment may indicate whether the canary deployment has failed based on an analysis of one or more metrics associated with performance of the application resources.

The status for the canary deployment can be determined based on various different analyses. For example, the status for the canary deployment may be determined based on an analysis that compares one or more metrics to one or more thresholds. As an example, if the one or more metrics exceed or violate a threshold (e.g., if a count of error codes exceeds a threshold; if an average time to first byte for an application resource exceeds a threshold), the application delivery manager may determine the status for the canary deployment to indicate that the canary deployment has failed. If none of the one or more metrics exceed or violate the threshold, the application delivery manager may determine the status for the canary deployment to indicate that the canary deployment has not failed.

As another example, the status for the canary deployment may be determined based on an analysis that compares metrics for the application resources to each other. As an example, one or more metrics for the one or more application resources that execute the updated version (e.g., application resources 645-a and 645-b) may be compared to one or more metrics for the one or more application resources that execute the original version (e.g., application resources 645-c to 645-e). Based on the comparison, the status for the canary deployment may be determined to indicate the canary deployment has not failed if the one or more metrics for the one or more application resources that execute the updated version do not exceed the one or more metrics for the one or more application resources that execute the original version (e.g., the counts of error codes for application resources 645-a and 645-b do not exceed the counts of error codes for application resources 645-c to 645-e). Based on the comparison, the status for the canary deployment may be determined to indicate the canary deployment has failed if the one or more metrics for the one or more application resources that execute the updated version exceed the one or more metrics for the one or more application resources that execute the original version (e.g., the counts of error codes for application resources 645-a and 645-b exceed the counts of error codes for application resources 645-c to 645-e).

As another example, the status for the canary deployment may be determined based on an analysis that applies a weighted summation to the metrics for the application resources. As an example, the four example metrics of Table II may be collected for each of the application resources that execute the updated version. Each example metric may be multiplied by its own weight and added to the weighted sum of the other metrics. The weights for the example metrics may be different from each other. If the overall weighted summation of all metrics is greater than or equal to a summation threshold, the application delivery controller may determine the status for the canary deployment to indicate the canary deployment has failed. If the overall weighted summation of all metrics is less than the summation threshold, the application delivery manager may determine the status for the canary deployment to indicate the canary deployment has not failed.

As another example, the status for the canary deployment may be determined based on a combination of the above-described analyses. For example, the weight summation analysis may be combined with a threshold-based analysis. As an example, one of the four example metrics of Table II may be assigned as a critical metric. In this way, even if the weighted summation of all metrics is less than the summation threshold, the application delivery manager may determine the status for the canary deployment to indicate the canary deployment has failed. More fully, the count of error codes may be assigned as a critical metric. Thus, if a count of error codes for an application resource (e.g., application resource 645-a or 645-b) exceeds a threshold, the application delivery manager may determine the status for the canary deployment to indicate the canary deployment has failed regardless to whether the weight summation analysis is above, below, or equal to the summation threshold.

At step 915, the one or more computing devices may determine whether to continue the canary deployment. This determination may be performed based on the status for the canary deployment and/or based on whether the application delivery controller is diverting or forwarding all traffic associated with the application to the one or more application resources that execute the updated version. For example, if the status for the canary deployment indicates the canary deployment has failed, the application delivery manager may determine not to continue the canary deployment. If the application delivery controller is diverting or forwarding all traffic associated with the application to the one or more application resources that execute the updated version, the application delivery manager may determine not to continue the canary deployment. If the status for the canary deployment indicates the canary deployment has not failed and if the application delivery controller is diverting or forwarding less than all traffic associated with the application to the one or more application resources that execute the updated version, the application delivery manager may determine to continue the canary deployment. If the one or more computing devices determine to continue the canary deployment, the method may proceed to step 917. If the one or more computing devices determine to not continue the canary deployment, the method may proceed to step 919.

At step 917, the one or more computing devices may cause the application delivery controller to increase an amount of the traffic being diverted or forwarded to the application resources that execute the updated version. For example, the application delivery manager may send, to the ingress controller, an indication of the status for the canary deployment (e.g., an indication that the canary deployment has not failed). Upon receiving the indication, the ingress controller may determine one or more diversion rules for the next stage of the canary deployment (e.g., based on data field 821 of the example configuration data 800 of FIG. 8 and whether the next stage is the second stage, third stage, fourth stage, or the like). The ingress controller may cause the application delivery controller to be configured with the one or more diversion rules for the next stage. Upon configuration, the application delivery controller may divert or forward an increased amount of traffic associated with the application to the application resources that execute the updated version (e.g., the second, third, or fourth stages of example 700; or the second or third stages of example 750). After causing configuration of the application delivery controller, the method may proceed to step 909 to receive one or more metrics associated with the next stage. The increasing performed at step 917 shows one of the ways in which the amount of traffic being diverted or forwarded to the one or more application resources that execute the updated version may change.

At step 919, the one or more computing devices may determine whether the canary deployment failed. This determination may be based on the status for the canary deployment. If the status for the canary deployment indicates the canary deployment has failed, the method may proceed to step 921. If the status for the canary deployment indicates the canary deployment has not failed, the method may proceed to step 923.

At step 921, the one or more computing devices may cause the canary deployment to be stopped. This step may be performed, for example, based on the status for the canary deployment indicating the canary deployment has failed. Causing the canary deployment to be stopped may include, for example, the application delivery manager sending an indication to the ingress controller to stop the canary deployment. Upon receiving the indication, the ingress controller may determine one or more diversion rules that cause the application delivery controller to stop routing or forwarding traffic to the one or more application resources that execute the updated version. The ingress controller may cause the application delivery controller to be configured with these one or more diversion rules. Thereafter, the application delivery controller may no longer divert or forward any traffic to the one or more application resources that execute the updated version. Additionally, the ingress controller may send, to the orchestrator, an indication that causes the orchestrator to remove the application resources that execute the updated version from the cloud-computing environment. The stopping performed at step 921 shows one of the ways in which the amount of traffic being diverted or forwarded to the one or more application resources that execute the updated version may change. After step 921, the method may end.

At step 923, the one or more computing devices may cause the canary deployment to be completed. This step may be performed, for example, based on the status for the canary deployment indicating the canary deployment has not failed. Causing the canary deployment to be completed may include, for example, the application delivery manager sending an indication to the ingress controller to complete the canary deployment. Upon receiving the indication, the ingress controller may determine one or more diversion rules that cause the application delivery controller to stop routing or forwarding traffic to the one or more application resources that execute the original version. The ingress controller may cause the application delivery controller to be configured with these one or more diversion rules. Thereafter, the application delivery controller may no longer divert or forward any traffic to the one or more application resources that execute the original version. Additionally, the ingress controller may send, to the orchestrator, an indication that causes the orchestrator to remove the application resources that execute the original version from the cloud-computing environment. After step 923, the method may end.

Figure 10:
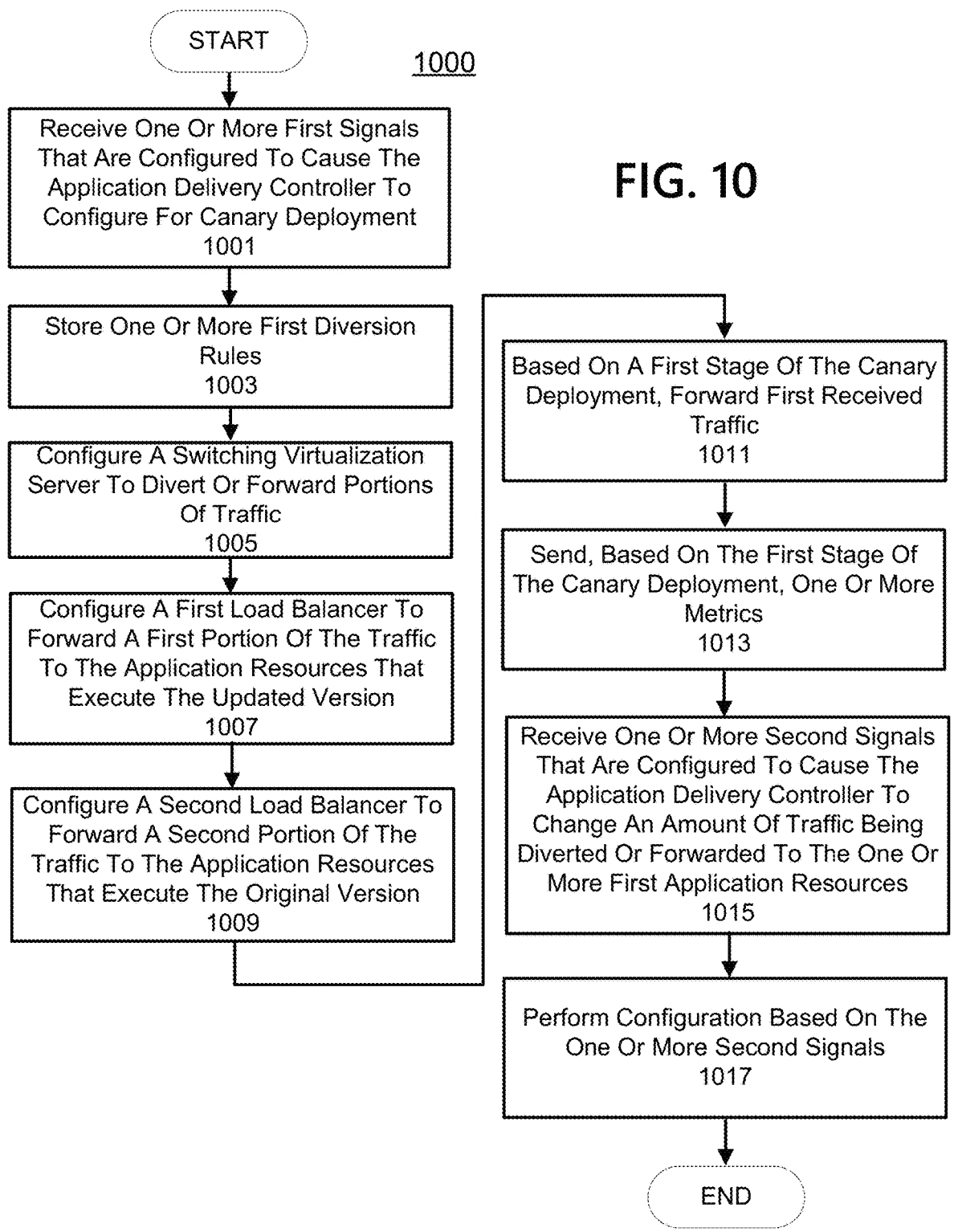

FIG. 10 depicts an example method 1000 that may perform a canary deployment of an updated version of an application. Method 1000 may be implemented by one or more suitable computing devices, as described herein. For example, method 1000 may be implemented, in whole or in part, by one or more computing devices configured as an application delivery controller (e.g., application delivery controller 620). The application delivery controller may be implemented on different computing devices than one or more other components of the computing environment (e.g., the application delivery controller may be implemented on a first computing device, and the application deployment manager may be implemented on a second computing device). Further, the application delivery controller may be implemented on one or more computing devices that also implement one or more other components of the computing environment (e.g., the ingress controller and the application delivery controller may be implemented on a first computing device). The example method 1000 may be an example of the steps performed by the application delivery controller based on, or otherwise in association with, performance of the example method 900 of FIG. 9.

At step 1001, the application delivery controller may receive one or more first signals that are configured to cause the application delivery controller to configure itself for canary deployment. The one or more first signals may be received from an ingress controller (e.g., based on performance of step 905 of FIG. 9). The one or more first signals may include one or more diversion rules (e.g., as determined by the ingress controller) and/or one or more instructions that cause the application delivery controller to configure itself for the canary deployment (e.g., one or more instructions that cause the application delivery controller to be configured as the application delivery controller 620 of FIG. 6).

Steps 1003-1009 provide an example of how an application delivery controller may configure itself for canary deployment based on the one or more first signals received at step 1001. In particular, steps 1003-1009 provide an example in accordance with the configuration of the application delivery controller 620 of FIG. 6.

At step 1003, the application delivery controller may store one or more first diversion rules. The one or more first diversion rules may be included in the one or more signals and may have been determined by the ingress controller (e.g., as described in connection with step 905 of FIG. 9 and/or ingress controller 615 of FIG. 6). As an example, the one or more first diversion rules may be associated with the first stage of the canary deployment. As another example, the one or more first diversion rules may include a rule that indicates a percentage of traffic to divert or forward to the application resources that execute the updated version of the application (e.g., forward 25% of traffic to the application resources that execute the updated version of the application). The one or more first diversion rules may be stored in a memory, container, or location that is accessible to the switching virtualization server of the application delivery controller (e.g., switching virtualization server 625 of FIG. 6).

At step 1005, the application delivery controller may configure a switching virtualization server to divert or forward portions of traffic to the application resources that execute the updated version of the application and/or the application resources that execute the original version of the application. The switching virtualization server may be configured to perform the diverting or forwarding based on any diversion rule stored at step 1005. The configuration of the switching virtualization server may be performed so that the switching virtualization server is configured similar to or the same as switching virtualization server 625 of FIG. 6.

At step 1007, the application delivery controller may configure a first load balancer to forward a first portion of the traffic to the application resources that execute the updated version of the application. The configuration may be performed so that the first load balancer is configured similar to or the same as the first load balancer 630 of FIG. 6.

At step 1009, the application delivery controller may configure a second load balancer to forward a second portion of the traffic to the application resources that execute the original version of the application. The configuration may be performed so that the second load balancer is configured similar to or the same as the second load balancer 635 of FIG. 6.

Steps 1011-1017 provide an example of how an application delivery controller may perform a stage of canary deployment based on how the application delivery controller is configured. In particular, steps 1011-1017 provide an example for performing a first stage of a canary deployment (e.g., the first stage as described in connection with FIGS. 7A and 7B).

At step 1011, the application delivery controller may, based on a first stage of the canary deployment, forward first received traffic to one or more application resources. For example, based on the configuration of the switching virtualization server, the one or more first diversion rules, the first load balancer, and the second load balancer (as described in connection with steps 1003-1009), the application delivery controller may forward a portion of the first received traffic (e.g., 25% of the received traffic) to the application resources that execute the updated version of the application. Continuing the example, the application delivery controller may forward the remaining portion of the first received traffic (e.g., 75% of the received traffic) to the application resources that execute the original version of the application.

At step 1013, the application delivery controller may send, based on the first stage of the canary deployment, one or more metrics. The one or more metrics may be sent to an application delivery manager. The one or more metrics may have been collected and/or determined by the application delivery controller based on performance of the application resources (e.g., the application resources that execute the updated version of the application and/or the application resources that execute the original version of the application). Example metrics are described in connection with Table II and step 909 of FIG. 9. The application delivery controller may send any and/or all of the example metrics described in connection with Table II and step 909 of FIG. 9.

At step 1015, the application delivery controller may receive one or more second signals that are configured to cause the application delivery controller to change an amount of traffic being diverted or forwarded to the application resources that execute the updated version of the application. The one or more second signals may be sent by an ingress controller based on whether the canary deployment should continue and/or whether the canary deployment has failed (e.g., as described in connection with steps 915-923 of FIG. 9). The one or more second signals may include one or more diversion rules and/or one or more instructions that cause the application delivery controller to configure itself for the canary deployment. The one or more second signals may, for example, be configured to cause an increase an amount of traffic being diverted or forwarded to the application resources that execute the updated version of the application (e.g., by including one or more second diversion rules associated with the second stage of the canary deployment). In this way, the one or more second signals may be based on determining to continue the canary deployment (e.g., as described in connection with steps 915 and 917 of FIG. 9). The one or more second signals may, for example, be configured to cause the canary deployment to be stopped (e.g., as described in connection with steps 919 and 921 of FIG. 9). The one or more second signals may, for example, be configured to cause the canary deployment to be completed (e.g., as described in connection with steps 919 and 923 of FIG. 9).

At step 1017, the application delivery controller may perform configuration based on the one or more second signals. For example, based on the one or more second signals, the application delivery controller may store one or more second diversion rules for a second stage of the canary deployment. As an example, based on the one or more second signals, the application delivery controller may modify the manner in which the switching virtualization server, the first load balancer, and/or the second load balancer is configured. Examples of the ways in which the application delivery controller may be configured are described in connection with FIG. 6; FIGS. 7A and 7B; and steps 917, 921 and 923 of FIG. 9. As a general example, the application delivery controller may perform configuration to perform the next stage in the canary deployment, to stop the canary deployment, or to complete the canary deployment. Further, if the application delivery controller is configured to perform the next stage in the canary deployment, the application delivery controller may perform similar processes as described in connection with steps 1011-1017 for the next stage (e.g., forward second received traffic based on a second stage of the canary deployment; send one or more second metrics based on the second stage; receive one or more third signals that are configured to cause the application delivery controller to change an amount of traffic being diverted or forwarded to application resources; and perform configuration based on the one or more third signals).

Based on the systems and methods described above, a canary deployment may improve application deployment in a cloud-computing environment. For example, the canary deployment may be performed based on one or more of an application delivery manager, an ingress controller, an application delivery controller, and orchestrator. By using such components of a cloud-computing environment to perform canary deployment, application deployment can be improved for the cloud-computing environment. As an example, the canary deployment may be performed in an automated fashion. As another example, the canary deployment may be performed based on an application deployment controller that is configured to, for example, divert or forward traffic to application resources. The configuration of the application deployment controller (e.g., the configuration of the application delivery controller 620) may provide benefits for performing the canary deployment. As another example, the canary deployment may be performed based on one or more metrics determined by the application delivery controller. In this way, the determination of the status for the canary deployment can be improved. The above improvements and benefits are intended to summarize a few of the improvements and benefits that result from the methods and systems described above.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by one or more computing devices, an indication that one or more first application resources have been configured, within a computing environment, based on an updated version of an application, wherein the computing environment includes one or more second application resources that have been configured based on an original version of the application;
   receiving, by the one or more computing devices, configuration data for canary deployment of the updated version over a plurality of stages, wherein the configuration data includes first data that indicates a time period for performing the plurality of stages and second data that indicates an amount, of diverted or forwarded traffic, to increase based on the plurality of stages;
   causing, by the one or more computing devices and based on the configuration data, configuration of an application delivery controller;

initiating the canary deployment of the updated version;
receiving, from the application delivery controller, one or more metrics associated with performance of the one or more first application resources;
determining, by the one or more computing devices and based on the time period for the plurality of stages, that a first stage of the plurality of stages has expired; and
based on the first stage having expired:
- determining, based on the one or more metrics, a status for the canary deployment, and
- causing, based on the status for the canary deployment, the application delivery controller to increase, based on the second data that indicates the amount to increase, traffic being diverted or forwarded to the one or more first application resources.

2. The method of claim 1, wherein the one or more metrics include one or more of the following: a count of error codes received from the one or more first application resources, a count of state flips for the one or more first application resources, an average time to first byte for the one or more first application resources, and a count of requests waiting in a queue for the one or more first application resources.

3. The method of claim 1, wherein the configuration of the application delivery controller includes:
- configuration of a server that is configured to, based on one or more diversion rules, divert or forward portions of traffic associated with the application to a first load balancer and a second load balancer;
- configuration of the first load balancer that is configured to receive, from the server, a first portion of the traffic associated with the application and forward the first portion to the one or more first application resources; and
- configuration of the second load balancer that is configured to receive, from the server, a second portion of the traffic associated with the application and forward the second portion to the one or more second application resources.

4. The method of claim 3, wherein the one or more diversion rules includes a restriction associated with a geographic location or a range of source addresses.

5. The method of claim 3, further comprising:
- determining, by an ingress controller and based on the second data that indicates the amount to increase, the one or more diversion rules, wherein a first diversion rule of the one or more diversion rules indicates, based on one or more data fields of the configuration data, a percentage of traffic to divert or forward to the one or more first application resources.

6. The method of claim 1, wherein the application delivery controller is a container-based application delivery controller.

7. The method of claim 1, wherein the determining the status for the canary deployment is performed by the application delivery controller.

8. The method of claim 1, wherein causing the application delivery controller to increase traffic being diverted or forwarded to the one or more first application resources is performed based on the status for the canary deployment indicating that the canary deployment has not failed.

9. The method of claim 1, wherein determining the status of the canary deployment is performed based on comparing the one or more metrics to one or more thresholds and/or based on comparing the one or more metrics to one or more additional metrics associated with performance of the one or more second application resources.

10. The method of claim 1, wherein determining the status of the canary deployment is performed based on applying a weighted summation to the one or more metrics and comparing the weighted summation to a summation threshold.

11. The method of claim 10, wherein determining the status of the canary deployment is performed based on a first metric being assigned as a critical metric and comparing the first metric to a threshold.

12. A method comprising:
receiving, by an application delivery controller, one or more first signals configured to cause the application delivery controller to configure itself for a first stage of canary deployment of an updated version of an application within a computing environment, wherein the canary deployment is to be performed in an automated fashion over at least the first stage and a second stage, wherein the computing environment includes one or more first application resources that have been configured based on the updated version of the application, and wherein the computing environment includes one or more second application resources that have been configured based on an original version of the application;
based on the one or more first signals, storing, by the application delivery controller, one or more first diversion rules associated with the first stage of the canary deployment;
based on the one or more first signals, configuring a server of the application delivery controller to, based on the one or more first diversion rules, divert or forward portions of traffic associated with the application to a first load balancer and a second load balancer;
based on the one or more first signals, configuring the first load balancer of the application delivery controller to receive, from the server, a first portion of the traffic associated with the application and forward the first portion to the one or more first application resources;
based on the one or more first signals, configuring the second load balancer of the application delivery controller to receive, from the server, a second portion of the traffic associated with the application and forward the second portion to the one or more second application resources;
based on performance of the first stage of the canary deployment in the automated fashion, forwarding, by the application delivery controller, first received traffic using the server, the first load balancer, the second load balancer, and the one or more first diversion rules;
sending, based on the first stage of the canary deployment and by the application delivery controller, one or more metrics associated with performance of the one or more first application resources;
based on the canary deployment continuing, in the automated fashion, from the first stage of the canary deployment and to a second stage of the canary deployment, receiving, by the application delivery controller, one or more second signals that are configured to cause the application delivery controller to configure itself for the second stage of the canary deployment by at least changing an amount of traffic being diverted or forwarded to the one or more first application resources;
based on the one or more second signals, storing one or more second diversion rules associated with a second stage of the canary deployment; and
based on the one or more second signals, configuring the server of the application delivery controller to, based on the one or more second diversion rules, change the amount of traffic being diverted or forwarded to the first load balancer or the second load balancer.

13. The method of claim 12, wherein the one or more metrics include one or more of the following: a count of error codes received from the one or more first application resources, a count of state flips for the one or more first application resources, an average time to first byte for the one or more first application resources, and a count of requests waiting in a queue for the one or more first application resources.

14. The method of claim 12, wherein the one or more first diversion rules includes a restriction associated with a geographic location or a range of source addresses.

15. The method of claim 12, wherein the application delivery controller is a container-based application delivery controller.

16. The method of claim 12, wherein a first diversion rule of the one or more first diversion rules indicates a first percentage of traffic to divert or forward to the one or more first application resources.

17. The method of claim 16, wherein a first diversion rule of the one or more second diversion rules indicates a second percentage of traffic to divert or forward to the one or more first application resources, wherein the second percentage is greater than the first percentage, and wherein the method further comprises:
  based on a second stage of the canary deployment, forward, by the application delivery controller, second received traffic using the server, the first load balancer, the second load balancer, and the one or more second diversion rules.

18. A system comprising:
an ingress controller; and
an application delivery controller;
wherein the ingress controller is configured to:
  receive an indication that one or more first application resources have been configured, within a computing environment, based on an updated version of an application, wherein the computing environment includes one or more second application resources that have been configured based on an original version of the application;
  receive configuration data for canary deployment of the updated version over a plurality of stages, wherein the configuration data includes first data that indicates a time period for performing the plurality of stages and second data that indicates an amount, of diverted or forwarded traffic, to increase based on the plurality of stages;
  send, to the application delivery controller, one or more first signals that are configured to cause, based on the configuration data, configuration of the application delivery controller;
  initiate the canary deployment of the updated version;
  receive, from the application delivery controller, one or more metrics associated with performance of the one or more first application resources;
  determine, based on the time period for performing the plurality of stages, that a first stage of the plurality of stages has expired; and
  based on the first stage having expired:
    determine, based on the one or more metrics, a status for the canary deployment, and
    send, to the application delivery controller, one or more second signals that are configured to cause, based on the status for the canary deployment, the application delivery controller to increase, based on the second data that indicates the amount to increase, traffic being diverted or forwarded to the one or more first application resources; and
wherein the application delivery controller is configured to:
  receive the one or more first signals;
  configure, based on the one or more first signals, the application delivery controller for the canary deployment;
  based on a first stage of the canary deployment, forward first received traffic to the one or more first application resources;
  send, based on the first stage of the canary deployment, one or more metrics associated with performance of the one or more first application resources; and
  receive the one or more second signals.

19. The system of claim 18, wherein the one or more metrics include one or more of the following: a count of error codes received from the one or more first application resources, a count of state flips for the one or more first application resources, an average time to first byte for the one or more first application resources, and a count of requests waiting in a queue for the one or more first application resources.

20. The system of claim 18, wherein the application delivery controller is a container-based application delivery controller being executed by one or more computing devices.

* * * * *